(12) United States Patent
Chen et al.

(10) Patent No.: US 11,620,162 B2
(45) Date of Patent: Apr. 4, 2023

(54) RESOURCE ALLOCATION OPTIMIZATION FOR MULTI-DIMENSIONAL MACHINE LEARNING ENVIRONMENTS

(71) Applicant: Capital One Services, LLC, McLean, VA (US)

(72) Inventors: Xinyu Chen, McLean, VA (US); Abhishek Shrivastava, McLean, VA (US); Boryana Manz, McLean, VA (US); Yingbo Li, McLean, VA (US); Katelyn Ge, McLean, VA (US); Jason Redd, McLean, VA (US); Shubham Chitkara, McLean, VA (US); Pothuraju Tallapaneni, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 131 days.

(21) Appl. No.: 17/328,029

(22) Filed: May 24, 2021

(65) Prior Publication Data

US 2022/0374274 A1   Nov. 24, 2022

(51) Int. Cl.
G06F 9/50     (2006.01)
G06F 11/34    (2006.01)
G06N 20/20    (2019.01)

(52) U.S. Cl.
CPC ........ G06F 9/5027 (2013.01); G06F 11/3495 (2013.01); G06N 20/20 (2019.01)

(58) Field of Classification Search
CPC .... G06F 9/5027; G06F 11/3495; G06N 20/20
See application file for complete search history.

(56) References Cited

U.S. PATENT DOCUMENTS

| | | | |
|---|---|---|---|
| 2019/0102700 A1* | 4/2019 | Babu | G06N 5/025 |
| 2019/0164014 A1* | 5/2019 | Tanaka | G06K 9/6267 |
| 2022/0277231 A1* | 9/2022 | Ostergaard | G06N 20/20 |

OTHER PUBLICATIONS

Li, Yingbo et al., "Multiple Changepoint Detection with Partial Information on Changepoint Times", May 13, 2019, pp. 1-80, arXiv:1511.07238v4 [stat.ME].
Li, Yingbo et al., "Automating Data Monitoring: Detecting Structural Breaks in Time Series Data Using Bayesian Minimum Description Length", Aug. 5, 2019, pp. 1-6, KDD-ADF-2019, Anchorage, AK.

* cited by examiner

Primary Examiner — Shirley X Zhang
(74) Attorney, Agent, or Firm — Perkins Coie LLP

(57) ABSTRACT

Some embodiments of the present application include obtaining first data from a data feed to be provided to a plurality of machine learning models and detecting a changepoint in the first data. In response to the changepoint being detected, a first machine learning model may be executed on the first data to obtain first output datasets. A first performance score for the first machine learning model may be computed based on the first output datasets. A second machine learning model may be caused to execute on the first data based on the first performance score satisfying a first condition.

20 Claims, 10 Drawing Sheets

RESOURCE ALLOCATION OPTIMIZATION FOR MULTI-DIMENSIONAL MACHINE LEARNING ENVIRONMENTS

BACKGROUND

Different machine learning models are used for different purposes (e.g., computer vision, speech recognition, etc.). Additionally, different machine learning models can operate at different frequencies, with some executing very frequently (e.g., hourly, daily, etc.) and others executing less frequently (e.g., monthly, yearly, etc.). Some machine learning models can be configured to execute on the same data even if the execution frequencies of those machine learning models vary. In some instances, the data executed on by a machine learning model can cause errors, inconsistencies, or other issues to arise. However, these issues are typically detected after running the machine learning model, wasting valuable processing resources, memory, and time.

SUMMARY

Some embodiments involve optimizing resource allocation in a multi-dimensional machine learning environment or other computing environments. As an example, computational resource usage may be reduced via selective execution of a machine learning model on data, where the selective execution is based on results of another machine learning model that executed on the data.

In some embodiments, first data from a data feed to be provided to a plurality of machine learning models may be obtained. The first data may be analyzed to detect whether the first data includes any changepoints. In response to a changepoint being detected, a first machine learning model may be caused to execute on the first data to obtain first output datasets. A first performance score for the first machine learning model may be computed based on the first output datasets. A second machine learning model may be caused to execute on the first data based on the first performance score satisfying a first condition.

In some embodiments, production data to be provided to a plurality of machine learning models may be obtained via a data feed, which may be configured to receive updated application data from one or more real-time applications. The plurality of machine learning models may include, for example, a first machine learning model and a second machine learning model, which each have a first execution frequency. In some embodiments, a changepoint in the production data may be detected based on a value of a first feature of the production data being determined to differ by more than a threshold amount from an expected value for the first feature. In response to detecting the changepoint in the production data, the first machine learning model and the second machine learning model may both be executed on the production data to obtain, respectively, first output datasets and second output datasets. In some embodiments, a first performance score for the first machine learning model may be computed based on the first output datasets, and a second performance score may be computed for the second machine learning model based on the second output datasets. In response to determining that the first performance score, the second performance score, or the first and second performance scores satisfy a condition, a third machine learning model having a second execution frequency, less than the first execution frequency, may be built. The third machine learning model may be executed on the production data. Additionally, the condition may be satisfied if the first performance score or the second performance score is less than a threshold performance score.

Various other aspects, features, and advantages of the invention will be apparent through the detailed description of the invention and the drawings attached hereto. It is also to be understood that both the foregoing general description and the following detailed description are examples and not restrictive of the scope of the invention.

DETAILED DESCRIPTION

In the following description, for the purposes of explanation, numerous specific examples are set forth in order to provide a thorough understanding of example embodiments. It will be appreciated, however, by those having skill in the art that embodiments may be practiced without these specific details or with an equivalent arrangement.

Figure 1:
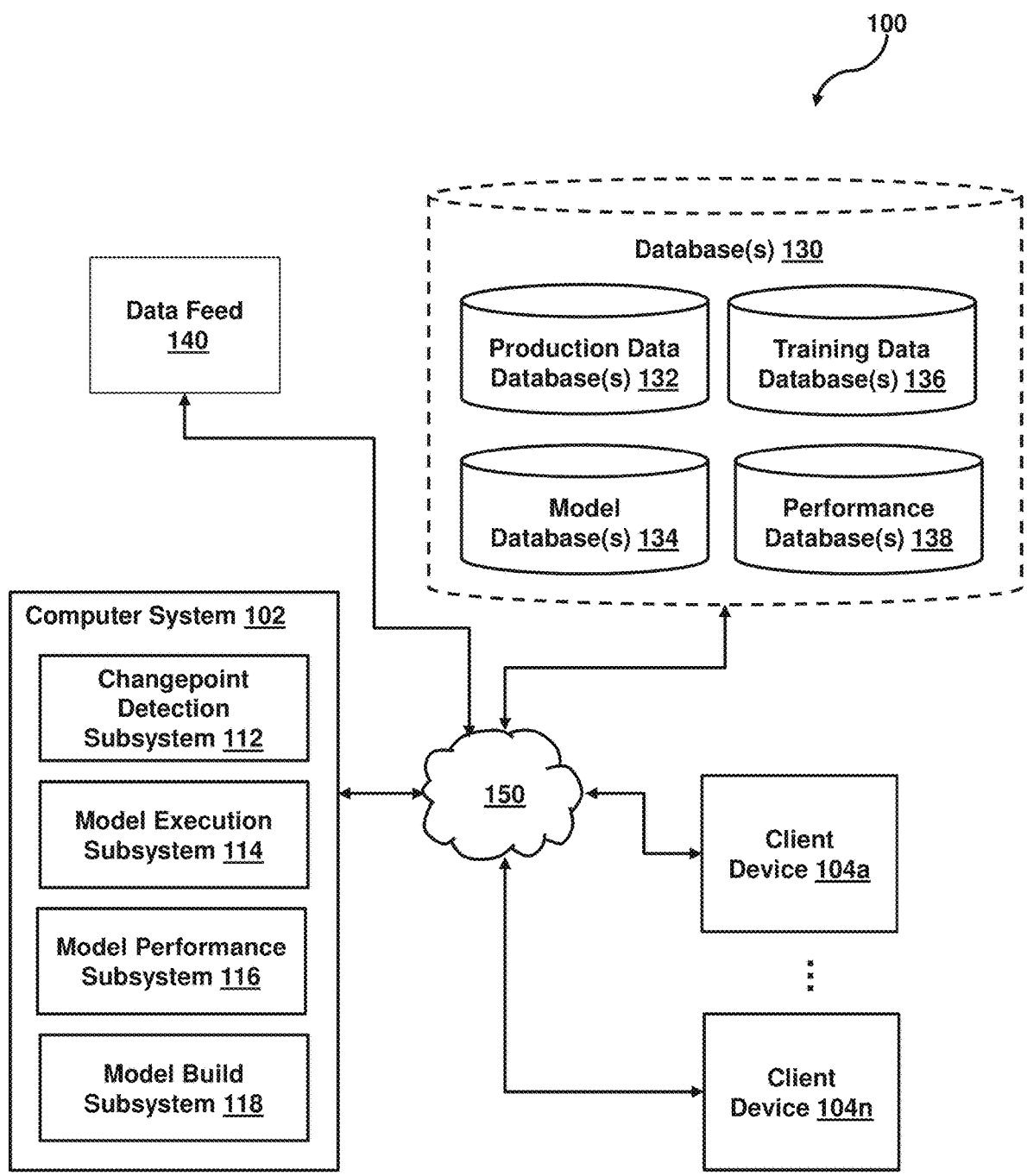
FIG. 1 shows a system for identifying changepoints, facilitating execution of prediction models, and providing feedback regarding causes of and remedies for changepoints, in accordance with one or more embodiments.

FIG. 1 shows a system 100 for identifying changepoints, facilitating execution of prediction models, and providing feedback regarding causes of and remedies for changepoints, in accordance with one or more embodiments. As shown in FIG. 1, system 100 may include computer system 102, client devices 104a-104n, which collectively may be referred to herein as "client devices 104" and may individually be referred to herein as "client device 104," data feeds 140, database(s) 130, or other components. Computer system 102 may include changepoint detection subsystem 112, model execution subsystem 114, model performance subsystem 116, model build subsystem 118, and/or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should also be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments). For instance, a machine learning model represents one type of prediction model, however not all prediction models are required to be machine learning models.

In machine learning environments, different machine learning models can execute at different execution frequencies, using the same or different data. For example, some machine learning models may execute on data daily or weekly, while other machine learning models may execute on data monthly or quarterly. In some instances, the data can cause errors with some of the machine learning models, such as inaccurate predictions, null result sets, or other issues. However, in many cases, these issues are not recognized until run time when the machine learning models execute on the data. The outputs from the machine learning models can then be incorrect, inconsistent, or invalid, creating technical problems such as valuable computational resources processing the data with the machine learning model being wasted as the model will likely need to be re-run at a later time once the data has been updated or cleaned. In some cases, to address the issues, the model may need to be rebuilt, re-trained, or replaced with another model. This can add additional complexities to the machine learning environment as the rebuilt, re-trained, or replacement model will need to be configured and then executed on the data (or updated data). In addition to wasting computational resources, the aforementioned scenarios are time consuming, particularly when a model needs to be rebuilt or re-trained. In real-world applications, latency in obtaining results from a machine learning model can be tremendously impactful.

Described herein are technical solutions to the above-mentioned technical problems related to non-optimal resource allocation and computing resource consumption, as well as machine learning result latency. In particular, the technical solutions described herein enable optimized resource allocation in machine learning environments, such as those described above. For instance, feedback from execution of some machine learning models on data can indicate whether problems will arise when executing other machine learning models on that data. In particular, in multi-thread environments, multiple machine learning models may be executed in parallel or substantially in parallel. For instance, while one processing core is used to execute one machine learning model, a different processing core can be used to execute another machine learning model. When it is determined that executing some machine learning models on the data will cause issues (e.g., running on one or more processing cores), based on the results of other machine learning models executing on that data (e.g., running on different processing cores), preventative actions may be initiated to conserve computing resources and ensure that those models are not executed. For example, the models may be replaced with other existing models, rebuilt, or re-trained.

As another example, additional models to better handle the data and not generate errors may be built and deployed so as to execute on the data without any latency. By doing so, computing resources are preserved for those machine learning models that will produce valid and applicable results. Additionally, the technical solutions described herein reduce latency in obtaining valid machine learning results by minimizing an amount of time wasted on machine learning models whose results will not be used, as well as having a model ready to execute at the desired execution frequency that will not cause invalid results to be produced. In some embodiments, the technical solutions may be implemented using a distributed computing environment. For example, computer system 102 may include a plurality of computing devices (e.g., multiple processing cores), to implement the disclosed techniques. As a result, latency in obtaining results can be reduced from thirty hours to as few as thirty minutes.

In some embodiments, production data may be obtained from a data feed, such as data feed 140, which may receive updated application data from one or more real-time application. Feature sets, observed results for the feature sets, and other information, may be extracted from the updated application data to generate the production data. The feature sets, observed results, or other information may be extracted based on model input parameters of a given model or set of models with which the production data is to be executed on. The model input parameters may indicate which features are relevant to a particular machine learning model such that the model is capable of generating output datasets. In some embodiments, a data feed from which production data is to be obtained may be selected, and the production data may be provided as an input to a trained machine learning model. Furthermore, data processing may be performed on raw data obtained from data feed 140 to generate the production data to be used as input to the trained machine learning model.

In some embodiments, data feed 140 may be selected from amongst a plurality of available data feeds based on a model identifier associated with a trained machine learning model with which the production data is to be provided. The model identifier may indicate a machine learning model or a type of machine learning model stored in a model repository, such as model database 134. Alternatively or additionally, the model identifier may indicate a type of machine learning model that was obtained from a training environment (e.g., a CNN for computer vision, GBM for a financial model, etc.). Based on the model identifier, data feed 140 may be selected and updated application data may be streamed from the selected data feed.

Data feed 140 may be configured to receive a continuous flow of updated application data from a corresponding real-time application. For example, a real-time application may generate and output updated application data, which may be received by data feed 140. As another example, the real-time application may generate and output the updated application data, which may be received by another data feed.

In some embodiments, data feed 140 may be configured to receive updated application data for a predetermined amount of time. For example, the updated application data may be provided to data feed 140 within a data stream. In some cases, the updated application data may not be stored persistently by data feed 140. In some cases, the updated application data may be buffered to local cache by a computing system associated with the data feed (e.g., computer system 102), which may be periodically purged to receive new updated application data from the real-time application.

In some embodiments, data feed 140, and other components of system 100 e.g., computer system 102, database(s) 130, etc.) may form a part or all of a data pipeline. The data pipeline may include a model training environment for training a machine learning model and a model monitoring environment for monitoring performances of deployed machine learning models. The model training environment may include a data pull process, a feature engineering process, a model build process, and a model scoring process. The data pull process may include causing training data to be retrieved from a data corpus for training a machine learning model. The feature engineering process may include refining the initial training data (and the validation data) such that the data represents features needed for input to a machine learning model to be trained. The model build process may include training a selected machine learning model with the training data. The model build process may take the training data as inputs for the machine learning model, and may cause outputs of the machine learning model to be fed back to the machine learning model as input to train machine learning model (e.g., alone or in conjunction with user indications of the accuracy of outputs, labels associated with the inputs, or with other reference feedback information). In some embodiments, the model scoring process may include testing the accuracy of the built machine learning model to determine whether the machine learning model has been properly trained using the validation data.

The model monitoring environment may be orthogonal or parallel to the model training environment, and can enable analysis of a trained machine learning model for production data as the production data is provided to the trained machine learning model. The model monitoring environment may include visualization processes, model stability processes, model accuracy processes, and alerting processes.

In some embodiments, an accuracy of a trained machine learning model may be computed based on production data. The accuracy of the machine learning model may indicate how well the trained machine learning is able to predict results for production data. This accuracy differs from the accuracy computed during the training process because the data used to compute the accuracy during the training process is derived from training data database 136. However, the accuracy of the trained machine learning model may be determined using the production data, which is obtained from a data feed (e.g., data feed 140), and which may only be available for a limited amount of time (e.g., while in the data stream).

In some embodiments, the production data may be obtained from updated application data, where the updated application data may be obtained from data feed 140. In some embodiments, the initial production data may be generated from the updated application data (e.g., updated application data) by extracting feature sets and observed results, and the production data may be generated by masking one or more features and/or results of the initial production data. As an example, the production data may include data items representing feature sets (e.g., a stream of credit card applications, with each credit card application including information such as an applicant's annual salary, residence, employment history, and the like). In some embodiments, the production data may include feature sets but not the corresponding observed results. In some embodiments, however, the production data may include the feature sets and the corresponding observed results, however the observed results may be masked so as to not be input to the machine learning model.

A given machine learning model may be configured to take, as input, the production data and generate predicted results data including results generated based on the feature sets of the production data. The predicted results may represent predictions from the machine learning model for each input feature set. In some embodiments, an accuracy score for the machine learning model may be computed based on the predicted results data and the production data. For example, a difference between the observed results and the predicted results may be determined, and based on the difference and a number of feature sets included by the production data, an accuracy score of the machine learning model may be determined.

In some embodiments, a determination may be made as to whether the computed accuracy score satisfies a threshold accuracy condition. For example, the threshold accuracy condition may be satisfied if the accuracy score is less than a threshold accuracy score. As another example, the threshold accuracy condition may be satisfied if the accuracy score is greater than or equal to a threshold accuracy score. In some embodiments, the threshold accuracy score may be determined based on an accuracy score previously determined for the machine learning model during the training process. If it is determined that the machine learning model satisfies the threshold accuracy condition, then a notification may be generated indicating that the training data used to train the machine learning model is to be updated. For example, new data sets may be retrieved and combined with some or all of the data sets used to generate the training data. Some embodiments include using some of the production data, if available, to generate updated training data. In some embodiments, the updated training data may be used to re-train the machine learning model, a new instance of the machine learning model, or a new machine learning model.

In some embodiments, residuals between the predicted results and the observed results may be computed. Residuals represent a difference between what is actually detected and what is predicted. For example if, for a machine learning model configured to predict a credit score for a given credit application, a predicted credit score is 700 and an actual credit score is 750, then the residual would be 50. In some embodiments, a graphical representation of the residuals may be generated to identify which feature or features contribute most or least to residuals. For example, the residuals may indicate that geographical location affects a credit score greater than expected or desired. In such cases, the machine learning model may, during a rebuild or subsequent training, or during deployment, modify one or more parameters (e.g., hyperparameters) to decrease or increase the effect of geographical location on credit score predictions. In some embodiments, an accuracy of the machine learning model may be determined based on the residuals. For instance, because the residuals reflect the difference between the predicted results and the observed results for a machine learning model, the accuracy score of the machine learning model may also be determined based on the residuals.

In some embodiments, a stability of a model may be determined by computing a stability score for the machine learning model based on the production data and the training data. The stability score may indicate how similar the production data being input to the machine learning model is to the training data used to train the machine learning model. In some embodiments, the stability score may indicate whether a distribution of features included by the production data and to be input to the trained machine learning model is the same or similar to a distribution of features included by the training data used to train the trained machine learning model. If the production data includes a distribution of features that greatly differs from the distribution of features included by the training data, then the machine learning model may be unable to generate predictions based on the production data, the predictions made by the machine learning model for the production data may be unreliable, increase latency in generating predictions for the production data, or cause other issues to occur. Different metrics may be used to compute the stability score including, but not limited to (which is not to suggest that other lists are limiting), population stability index (PSI), characteristic stability index (CSI), principal component analysis (PCA), or other metrics. PSI measures an amount of shift in a population of variables between two data sets. CSI identifies which variable is causing a shift in the population of variables. PCA determines which variable is having the greatest amount of influence from the population of variables. In some embodiments, a determination may be made as to whether the stability score satisfies a threshold stability condition. The threshold stability condition may be satisfied if the computed stability score for the production data is less than a threshold stability score. As an example, a determination may be made as to whether a PSI value, determined based on the training data and the production data, is less than a threshold PSI value. If so, the PSI value (e.g., the stability score) may be classified as satisfying the threshold stability condition. Some embodiments include generating a notification to update the training data and/or cause the trained machine learning model to be rebuilt in response to determining that the computed stability score (e.g., the PSI value) satisfies the threshold stability condition (e.g., the PSI value is less than the threshold PSI value).

In some embodiments, a determination may be made as to whether a particular value of a feature included within the production data differs from an expected value for that feature based on the training data. For example, if the training data used to train the machine learning model included credit card applications, each credit card application may include a feature of annual salary for the applicant. A value provided by each application for this feature may be extracted from each application, and an average value for this feature may be determined. For example, the average annual salary of applicants included within credit card applications used to train the machine learning model to approve/not-approve each applicant for a credit card may be computed by summing the value of annual salary from each credit card application and dividing the summed value by the number of applications to obtain the average value. When the production data is analyzed, a determination can be made as to whether a value associated with the annual salary feature for a given data item of the production data differs from the average value by more than a threshold amount. If so, then this may indicate that some of the production data does not reflect the data expected to be input to the trained machine learning model. Therefore, a notification may be generated to cause the training data to be updated and/or the machine learning model to be rebuilt. In some embodiments, a determination is made as to whether a number of instances of a value associated with a given feature in the production data differing from an expected value for that feature occurs in the production data more than a threshold number of times. For example, a single instance of a value for average salary exceeding the threshold amount may not necessitate updating the training data or rebuilding the model.

In some embodiments, a similarity score between the training data and the production data may be determined based on the expected pattern of features represented by the training data and observed patterns of features represented within the production data. For example, the expected pattern of features represented by the training data may indicate a substantially static distribution of features included by the training data. It may then be determined whether the patterns of features observed within the production data is also the same or similar to the pattern of features within the training data. In some embodiments, a determination is made as to whether a threshold similarity condition is satisfied (e.g., if the similarity score is greater than or equal to a threshold similarity score) indicating how similar the training data and the production data are. In response to determining that the similarity score fails to satisfy the threshold similarity condition, the machine learning model may be rebuilt and/or the training data used to train the machine learning model may be updated.

In some embodiments, a number of anomalies within the production data may be detected. For example, a number of NULL values present within the production data may be determined. A NULL value, which may also be referred to herein interchangeably as a "NULL entry," indicates that a data value for a given data field does not exist. For example, a NULL value for the feature "annual salary," (e.g., one type of data field that data can be input to in an example credit card application), may indicate that no value exists for this feature for a particular data item. A determination may be made as to whether a number of NULL values in the production data is greater than a threshold number of NULL values and, if so, a notification may be generated to cause the training data to be updated and/or the machine learning model to be rebuilt.

Additional details related to the data pipeline, training environment, and model monitoring environment, are included in U.S. patent application Ser. No. 17/089,645, filed on Nov. 4, 2020, the disclosure of which is incorporated herein by reference in its entirety.

Production data may be generated from the updated application data retrieved from a selected data feed. In some embodiments, updated application data may include a plurality of data items representing a plurality of feature sets and observed results respectively corresponding to each of the plurality of feature sets. Each of the feature sets may include one or more types of features represented by the updated application data. For example, one of feature sets may include the feature type "salary information," corresponding to a feature "salary," which may be used as a model input parameter to a financially-related prediction model. Each of the observed results may indicate a result obtained via an automated decision process, an enhanced review decision process, or other decision making process. In some embodiments, the automated decision process may be made in real-time. The automated decision process may provide a result given an input data item having one or more feature sets within a predetermined amount of time from the data item being input. For example, the observed result may be obtained from the automated decision process in less than 30 seconds, less than 15 seconds, less than 10 seconds, less than 5 seconds, or within other amounts of time. In some embodiments, the automated decision process may determine an observed result for a data item based on the feature sets, and thus the features, represented by the data item. Furthermore, different feature sets can cause different observed results.

As an example, the automated decision process may correspond to a real-time credit card application approval process. The example real-time credit card application approval process may take the input features provided by an individual and determine whether the individual is approved/not approved for a credit card based on the input features. For example, an individual may input annual salary information, length of employment, geographical information, and the like, into the real-time credit card application. Based on these inputs, the real-time credit card application approval process may either approve or not approve the individual for the credit card. The approval/non-approval of the individual may represent an example of an observed result, where the credit card application may represent the data item, and the information provided by the individual via the credit card application may represent the feature sets including features such as annual salary information, length of employment, geographical information, etc.

As another example, the automated decision process may correspond to a real-time credit determination process, whereby an amount of credit is determined for an individual based on information provided by a user to a credit application. Similar to the real-time credit card application approval process example described above, an individual may provide, as an input, annual salary information, length of employment, geographical information, and the like, into the real-time credit determination process. Based on the inputs, the real-time credit determination process may determine an amount of credit to allocate to the individual (or an account associated with the individual). The amount of credit may represent another example of an observed result, where the credit application may represent the data item, and the information provided by the individual via the credit application may represent the feature sets including features such as annual salary information, length of employment, geographical information, etc.

While the aforementioned examples relate to financial real-time automated processes, applications outside of finance are also applicable. For example, the automated decision process may correspond to an autonomous driving decision process. In this example, the real-time object detection process may take, as an input, an image, a frame from a real-time video feed, a feature vector indicating objects detected within an image or frame from a video, and the like. Based on the inputs, the autonomous driving decision process may generate a decision regarding a driving maneuver to be performed by a vehicle. For example, the decision may include causing the vehicle to turn right or left, how much to turn the vehicle, whether to speed up or slow down the vehicle, or to perform a different maneuver. The maneuver to be performed may represent yet another example of an observed result, where the input image, frame, feature vector, etc. may represent the data item, and detected objects may represent the feature sets including features such as type of object detected, distance to the detected object, velocity, directionality, etc.

As an example, the enhanced review decision process may correspond to a subsequent review of the credit card application approval process. For instance, after the real-time credit card application approval process generates an initial result, the credit card application and initial result may be provided to an enhanced review system for determining whether the initial result was correct. This may include providing the credit card application to a robust set of algorithms to determine the eligibility of the individual, allowing one or more human reviewers to analyze the credit card application, and the like. Based on the enhanced review system's analysis of the real-time credit card application approval process, an approval/non-approval of the individual's credit card application may be generated. In this example, the observed result may represent the approval/non-approval of the individual's credit card application, where the credit card application may represent the data item, and the information provided by the individual via the credit card application may represent the feature sets including features such as annual salary information, length of employment, geographical information, etc.

As another example, the enhanced review decision process may correspond to a subsequent review of the credit determination process. In this example, an enhanced review system may determine whether the real-time credit determination process generated an appropriate amount of credit for an individual based on information provided by the individual via a credit application. This may include providing the credit card application to a robust set of algorithms to determine an amount of credit to be allotted to the individual, allowing one or more human reviewers to analyze the credit card application and determine an amount of credit to be allotted to the individual, and the like. Based on the enhanced review system's analysis of the credit determination process, an amount of credit to be allocated to the individual (or an account associated with the individual) may be generated. Similar to the real-time credit determination process, the amount of credit determined by the enhanced review system's analysis may represent another example of an observed result, where the credit application may represent the data item, and the information provided by the individual via the credit application may represent the feature sets including features such as annual salary information, length of employment, geographical information, etc.

As yet another example, the enhanced review decision process may correspond to a subsequent review of the autonomous driving decision process. In this example, an enhanced review system may determine whether the autonomous driving decision process generated an appropriate decision regarding a driving maneuver to be performed by a vehicle. This may include providing the input information (e.g., the image, frame from the video feed, feature vector, etc.) to a robust set of algorithms to determine a maneuver to be performed, allowing one or more human reviewers to analyze the input information and determine a maneuver to be performed, and the like. Based on the enhanced review system's analysis of the autonomous driving decision process, a maneuver to be performed may be generated. For example, the decision may include causing the vehicle to turn right or left, how much to turn the vehicle, whether to speed up or slow down the vehicle, or to perform a different maneuver. In some embodiments, the maneuver determined by the enhanced review system may differ from the real-time autonomous driving decision process's result. The maneuver to be performed, determined by the enhanced review system, may represent yet another example of an observed result, where the input image, frame, feature vector, etc., may represent the data item, and detected objects may represent the feature sets including features such as type of object detected, distance to the detected object, velocity, directionality, etc.

In some embodiments, the production data may be monitored for detection of a changepoint. A changepoint represents instances of data abruptly shifting in some manner. In particular, changepoints represent abrupt shifts in time series data (e.g., data that is sequential in time). A goal of changepoint detection is to identify a location (e.g., a time) that a particular changepoint or changepoints occurred in the data, as well as determining a number of changepoints in the data. Production data, $P_t$, as described herein, is one example of time series data:

$$\text{Production Data: } P_t = (P_1, P_2, \ldots, P_n) \quad \text{Equation 1.}$$

In Equation 1, each data point $P_t$, with $t=1, 2, \ldots, n$, represents an observed value of the data at time t. When a changepoint is detected in the production data, the data experiences some sort of abrupt and distinct change. Some example changes that can represent changepoints include, but are not limited to (not to suggest that other lists are limiting), mean shifts (e.g., a shift in the mean value of the data) or a slope change.

In some embodiments, the production data may be analyzed to identify a set of candidate changepoints. In particular, in a multiple changepoint detection environment, which can occur when analyzing real world data, the total number of different multiple changepoints may be of the order $2^n$. Therefore, candidate changepoints (e.g., multiple changepoints) may be referred to as models. For each model (e.g., candidate multiple changepoint), a changepoint score can be computed. For example, a Bayesian Minimum Description Length (BMDL) score may be computed. After computing all of the BMDL scores, a model having a smallest BMDL score may be selected, and all changepoints included in that model can be classified as detected changepoints.

In some embodiments, a magnitude of the changepoint detected may be computed to determine whether the input data stream from data feed 140 has become corrupted. For example, a slope and mean before the changepoint and a slope and mean after the changepoint may be compared to determine if the change in the slope and the mean exceeds a threshold slope change and/or a threshold mean change. If the change in the slope or mean is greater than the threshold slope or mean change, then this may indicate that a new machine learning model needs to be built or a current machine learning model needs to be rebuilt or re-trained.

If a changepoint is detected in the production data, then one or more machine learning models may be executed on the production data. For example, after detecting a changepoint in the production data, the production data may be provided to a first machine learning model and a second machine learning model having a same or similar execution frequency. Additionally, the production data may be provided to other machine learning models having different execution frequencies. The execution frequency represents a cadence with which a particular machine learning model executes. For example, a machine learning model may have a daily execution frequency (e.g., executes every day), a weekly execution frequency (e.g., executes every week), a monthly execution frequency (e.g., executes every month/30 days), or other execution frequencies. In some embodiments, the first and second machine learning models may have a first execution frequency (e.g., daily, weekly, etc.). Other machine learning models, which are also to be provided with the production data, may have a second execution frequency (e.g., monthly, quarterly, etc.).

In response to detecting the changepoint in the production data, the first and second machine learning models may be executed on the production data, thereby obtaining first output datasets and second output datasets, respectively. The first and second output datasets may be used to compute a performance score for the first and second machine learning models. For example, a mean, variance, autocovariance, quantile, or other metrics, may be computed for the first and second machine learning models. Alternatively, other metrics indicating a quality of a machine learning model may be computed using the output datasets. For example, a distribution of the output datasets may be computed.

In some embodiments, a determination may be made as to whether the performance scores computed for each of the first and second machine learning models satisfy a condition. The condition, for example, may be satisfied when a performance score is less than or equal to a threshold performance score. The threshold performance may be determined based on historical performance scores for a given machine learning model. For example, the performance score may be computed by determining how accurately a given machine learning model predicted a particular result based on training data used to train that machine learning model as compared to the result obtained via the machine learning model executing on the production data. The closer the predicted result is to the actual result obtained, the better the performance of the model is said to be.

Models that poorly predict results may require certain actions to be taken. In some embodiments, if either the first or second machine learning model has a performance score that satisfies the condition (e.g., the performance score is less than or equal to a threshold performance score), then this may indicate that a corresponding model may need to be re-trained or rebuilt. Retraining a model may include updating the training data used to train the model.

In some embodiments, as mentioned above, the production data is to be provided to other machine learning models having different execution frequencies than that of the first and second machine learning models. Given that the performance of the first or second machine learning models, when executed on the production data, failed to satisfy the condition, the other machine learning models may experience problems as well. However, because some of the other machine learning models run at a different execution frequency, these problems may not arise until after those machine learning models execute on the production data. To prevent such problems, and thus wasting computing resources, in response to determining that either the first or second machine learning model's corresponding performance score does not satisfy the condition, the production data may be provided to a different machine learning model than originally intended. For instance, in some embodiments, a third machine learning model, having a second execution frequency different than the first execution frequency of the first and second machine learning models may be selected to execute on the production data. As an example, the selected machine learning model may be better configured to handle the production data than the machine learning model originally intended to be executed on the production data, thereby optimizing resource allocation to a model that will produce valid and useful results.

In some embodiments, the third machine learning model may be built in response to the determination that the first or second machine learning models' performance score does not satisfy the condition. For example, the third machine learning model may be built such that the model parameters of the third machine learning model are not dependent on the features in the production data with which the changepoint (or changepoints) are associated. For example, if a changepoint in the production data is detected for a particular variable, such as a credit score, grayscale, or other feature, then the third machine learning model may be configured such that that particular variable has minimal or no impact on the output datasets of the model. Therefore, the machine learning environment's computing resources can be conserved for use with models that will produce valid and useful results, and can also minimize the amount of computing resources being used by models that could have difficulties handling the production data (e.g., due to the variable in the production data having the changepoint and the model parameters of that model). Consequently, latency in obtaining results is minimized, thereby improving operating efficiency of the machine learning environment.

Subsystems 112-118

In some embodiments, changepoint detection subsystem 112 is configured to detect instances of changepoints in data. For instance, changepoint detection subsystem 112 may determine whether production data to be executed on by one or more machine learning models includes any changepoints. Changepoint detection subsystem 112 may retrieve production data from data feed 140. Data feed 140 may receive updated application data from a real-time application. In some embodiments, the production data may be stored in production data database 132, and changepoint detection subsystem 112 may retrieve the production data from production data database 132 instead. Additionally, a single data feed (e.g., data feed 140) is depicted in FIG. 1 for illustrative purposes only, and system 100 may include additional data feeds.

Data feed 140 may be configured to receive a continuous flow of updated application data from a corresponding real-time application. For example, a real-time application may generate and output updated application data, which may be received by data feed 140. Data feed 140 may be configured to receive updated application data for a predetermined amount of time. For example, the updated application data may be provided to data feed 140 within a data stream. In some cases, the updated application data may not be stored persistently by data feed 140. In some cases, the updated application data may be buffered to local cache by a computing system associated with data feed 140 (e.g., computer system 102), which may be periodically purged to receive new updated application data from the real-time application.

Production data may be generated from the updated application data. In some embodiments, the updated application data may include a plurality of data items representing a plurality of feature sets and observed results respectively corresponding to each of the plurality of feature sets. Each of the feature sets may include one or more types of features represented by the updated application data. For example, one of the feature sets may include the feature type "salary information," corresponding to a feature "salary," which may be used as a model input parameter to a financially-related prediction model.

Each observed result may indicate a result obtained via an automated decision process, an enhanced review decision process, or other decision making process. In some embodiments, the automated decision process may be made in real-time. The automated decision process may provide a result given an input data item having one or more feature sets within a predetermined amount of time of the data item being input. For example, the observed result may be obtained from the automated decision process in less than 30 seconds, less than 15 seconds, less than 10 seconds, less than 5 seconds, or within other amounts of time. In some embodiments, the automated decision process may determine an observed result for a data item based on the feature sets, and thus the features, represented by the data item. Furthermore, different feature sets can cause different observed results.

As an example, the automated decision process may correspond to a real-time credit card application approval process. The example real-time credit card application approval process may take the input features provided by an individual and determine whether the individual is approved/not approved for a credit card based on the input features. For example, an individual may input annual salary information, length of employment, geographical information, and the like, into the real-time credit card application. Based on these inputs, the real-time credit card application approval process may either approve or not approve the individual for the credit card. The approval/non-approval of the individual may represent an example of an observed result, where the credit card application may represent the data item, and the information provided by the individual via the credit card application may represent the feature sets including features such as annual salary information, length of employment, geographical information, etc.

As another example, the automated decision process may correspond to an autonomous driving decision process. In this example, the real-time object detection process may take, as an input, an image, a frame from a real-time video feed, a feature vector indicating objects detected within an image or frame from a video, and the like. Based on the inputs, the autonomous driving decision process may generate a decision regarding a driving maneuver to be performed by a vehicle. For example, the decision may include causing the vehicle to turn right or left, how much to turn the vehicle, whether to speed up or slow down the vehicle, or to perform a different maneuver. The maneuver to be performed may represent yet another example of an observed result, where the input image, frame, feature vector, etc. may represent the data item, and detected objects may represent the feature sets including features such as type of object detected, distance to the detected object, velocity, directionality, etc.

The resulting production data produced by data feed 140, and subsequently retrieved or streamed to changepoint detection subsystem 112, may therefore represent time series data, such as $P_t=(P_1, P_2, \ldots, P_n)$ described above with respect to Equation 1. In some embodiments, the time series data may be multi-dimensional. For example, the time series data may include multiple variables (e.g., a price of an item, a salary, a credit score, a grayscale value, etc.), some of which may be independent variables, while others may be correlated. Thus, changepoints, which represent abrupt changes in a value of the data, may occur in one or more dimensions. In some embodiments, each dimension is orthogonal to the other dimensions. For example, consider an n-dimensional feature vector residing in an n-dimensional feature space. Each feature is representative of one dimension in the n-dimensional feature space. Thus, each variable represented in the data resides in a different dimension of an n-dimensional feature space which, so long as n is greater than 1, corresponds to a multi-dimensional space.

Figure 2:
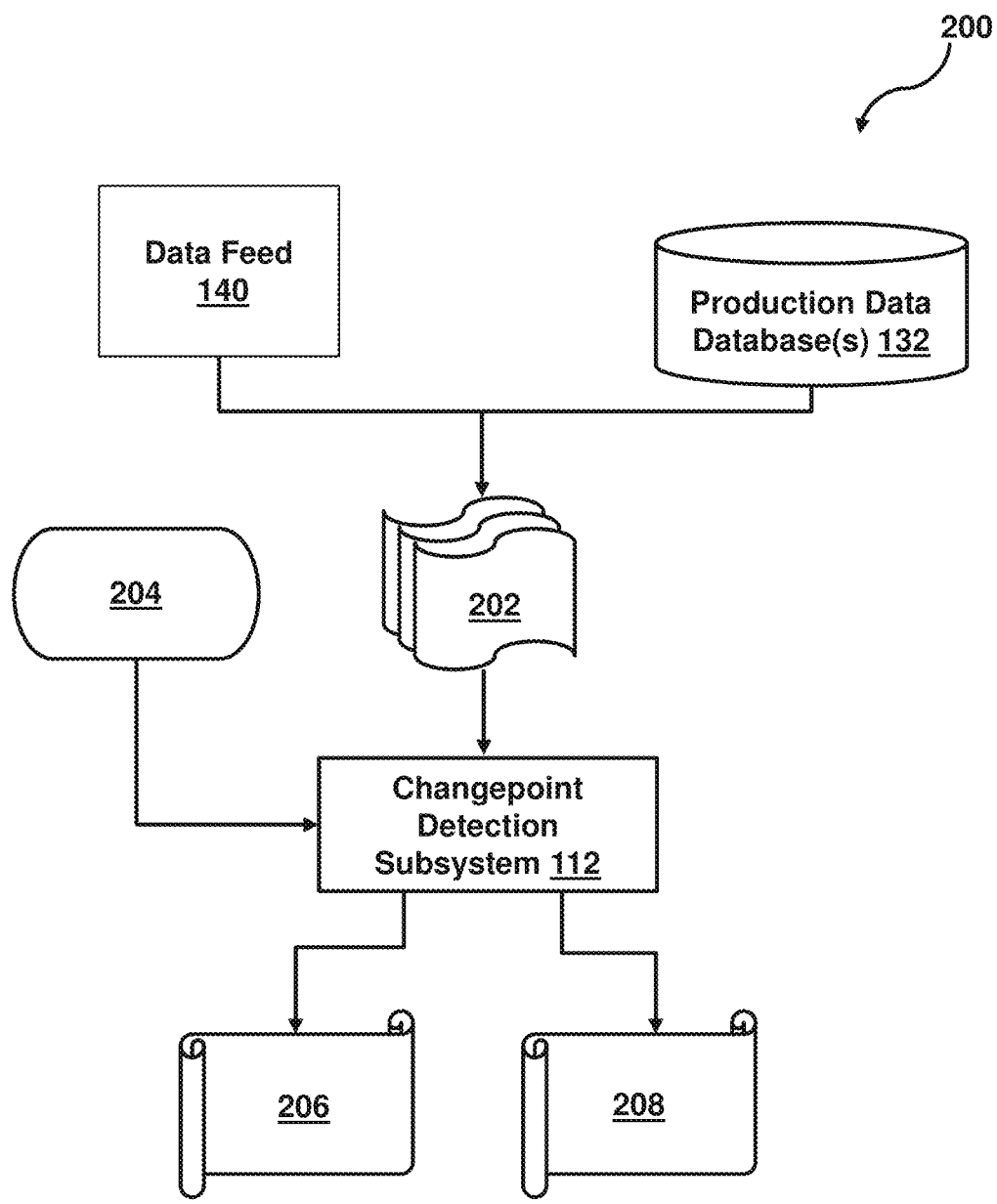
FIG. 2 shows a process for determining whether production data includes a changepoint, in accordance with one or more embodiments.

Changepoint detection subsystem 112 may be configured to detect multiple changepoints in time (e.g., time t= {1, 2, . . . , n}) for the production data. For example, with reference to FIG. 2, process 200 includes production data 202 being provided to changepoint detection subsystem 112. Production data 202 may be obtained from data feed 140, production data database 132, or another data source. Changepoint detection subsystem 112 may be configured to detect candidate multiple changepoint configurations in production data 202, which may each be referred to as a model or candidate model. Changepoint detection subsystem 112 can perform model selection based on the Bayesian Minimum Description Length (BDML) framework. Some embodiments include computing a BDML score for each candidate model and selecting the candidate model having the smallest BDML score. All changepoints included in the selected candidate model may be classified as detected changepoints.

Figure 3:
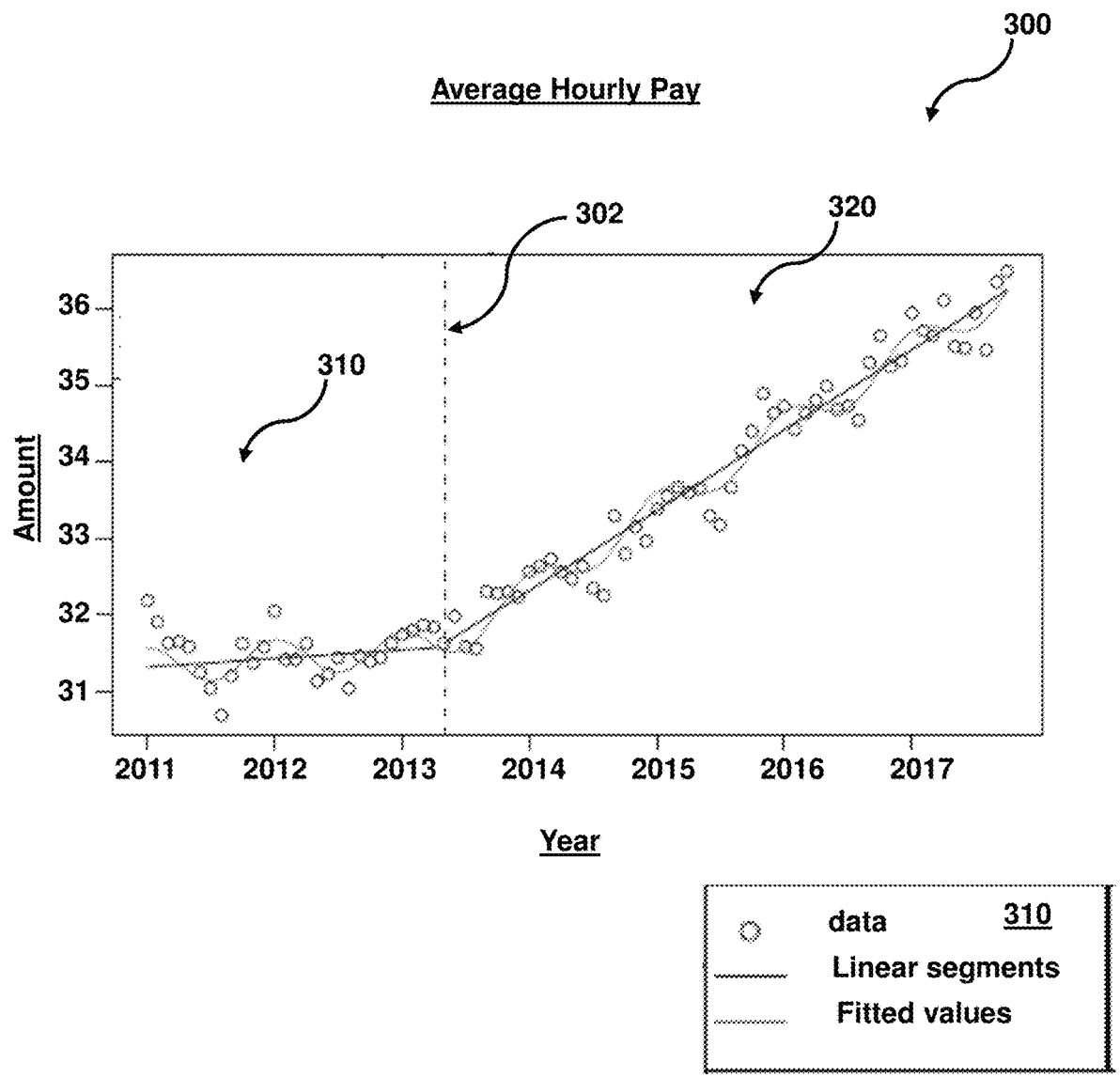
FIG. 3 shows a graph of time series data including a detected changepoint, in accordance with one or more embodiments.

As mentioned above, changepoints represent abrupt changes in time series data (e.g., in production data 202). Some examples of changes that can occur are shifts in a mean value of the data and/or shifts in a slope of the data. Production data 202, therefore, can include different regimes which will have one mean and slope value before a given changepoint and a different mean and slope value after the changepoint. As an example, with reference to FIG. 3, graph 300 includes a single changepoint 302. Graph 300 depicts an example of an average hourly pay (e.g., in American dollars) over a given temporal range. Each data point corresponds to a certain value of the average hourly pay for a particular time. In some embodiments, graph 300 may be fitted using a model for determining whether the data includes a changepoint (or multiple changepoints). After fitting, the model can be segmented into regions corresponding to data before the changepoint and after the changepoint. For example, graph 300 includes two regimes, first regime 310 occurring before changepoint 302, and second regime 320 occurring after changepoint 302. Both the intercept and slope of the production data represented in graph 300 differ between first regime 310 and second regime 320.

Given a candidate changepoint model, an observed data value $P_t$ at time t can be represented by Equation 2:

$$P_t = \alpha_1 + \beta_1 t + \alpha_{r(t)} + \quad \text{Equation 2}$$
$$\beta_{r(T)}t\left(\sum_{i=1}^{k}\left[\theta_{i,1}\cdot\text{sinsin}\left(\frac{2\pi ti}{T}\right) + \theta_{i,2}\cdot\text{coscos}\left(\frac{2\pi ti}{T}\right)\right]\right) + \epsilon_t.$$

In Equation 2, the first term represents the linear segment in Regime 1, the second term represents the linear segment in Regime r, the third term is a harmonic function representing a seasonal mean cycle, and the fourth term represents autocorrelated error. Although the values of the intercept and slope, a and (3, respectively, are not known, they do differ between the first and second regimes, as illustrated by first regime 310 and second regime 320 of graph 300. The harmonic function is to account seasonal-related fluctuations, such as, for example, the cost of a particular item during different times of year.

Changepoint detection subsystem 112 may be configured to apply Equation 2 to the production data to detect instances of changepoints. Additional details regarding changepoint detection techniques, such as those related to error correction and derivation of the BDML expression can be found in "Automating Data Monitoring: Detecting Structural Breaks in Time Series Data Using Bayesian Minimum Description Length," Li et al., 2019; and "Multiple Changepoint Detection with Partial Information on Changepoint Times," Li et al., 2019, which are each incorporated herein by reference in their entirety. In some embodiments, changepoint detection subsystem 112 receives production data 202 as well as expected feature values 204. Using production data 202 and expected feature values 204, changepoint detection subsystem 112 can determine whether production data 202 includes one or more changepoints. For example, expected feature values may represent a predetermined or dynamically computed value for a given feature. Returning to FIG. 3, an expected value for the feature of average hourly pay shortly almost midway through 2013 is approximately 31.50. However, as can be seen in graph 300, there is an abrupt change from the expected value of the average hourly pay midway through 2013, whereby the average hourly pay increases dramatically.

Changepoint detection subsystem 112 may generate an indicator reflecting whether any changepoints were detected. For example, changepoint detection subsystem 112 may generate a changepoint indicator 206 indicating that at least one changepoint was detected in production data 202. In some embodiments, changepoint indicator 206 includes data representing a number of changepoints detected in production data 202, a location (temporally) of each changepoint in production data 202, an order (e.g., first changepoint, second changepoint, etc.) of the detected changepoint(s), or other information. For example, changepoint indicator 206 may be a tuple of {Changepoint, Time}, however other formats can be used. If no changepoints are detected in production data 202, changepoint detection subsystem 112 may generate and output no-changepoint indicator 208. No-changepoint indicator 208 may indicate features regarding production data 202, such as metrics computed for production data 202, as well as a NULL flag indicating a lack of detected changepoints. In some embodiments, changepoint indicator 206 and no-changepoint indicator 208 may include data indicating parameter values for α and β, error correction values, or other data. This can allow for additional insight to be made with respect to the behavior of production data 202, which can be used for future modeling, analysis, and/or training.

In some embodiments, changepoint detection subsystem 112 is configured to generate alerts, notifications, messages, or other communications indicating that a changepoint has been detected. For example, upon detecting a changepoint in production data 202, changepoint detection subsystem 112 may generate a message including changepoint indicator 206, which may be provided to a user, such as a system administrator, via that user's corresponding client device 104. In some embodiments, the message may also indicate actionable recommendations, such as whether the alert is to be escalated, a model is to be rebuilt, or other information.

In some embodiments, model execution subsystem 114 is configured to execute one or more of a plurality of machine learning models stored in model database 134. As mentioned previously, some of the machine learning models may have a first execution frequency (e.g., daily, weekly, etc.), while others may have a second, different, execution frequency (e.g., monthly, quarterly, etc.). Furthermore, some of the machine learning models stored in model database 134 take, as input, different model parameters to obtain different results. For example, some machine learning models may take as model inputs credit score, annual salary, years of employment, etc., while others may take as model inputs color gradients, edge locations, pixel locations of landmarks, etc. The model input parameters may indicate which features are relevant to a particular machine learning model such that the model is capable of generating output datasets. The machine learning models may be selected from model database 134 based on a particular process, task, or objective sought to be obtained by the model. For example, a convolutional neural network (CNN) may be selected from model database 134 for processes related to computer vision. The various machine learning models stored by model database 134, from which model execution subsystem 114 may select from, include, but are not limited to (which is not to suggest that any other list is limiting), any of the following: Ordinary Least Squares Regression (OLSR), Linear Regression, Logistic Regression, Stepwise Regression, Multivariate Adaptive Regression Splines (MARS), Locally Estimated Scatterplot Smoothing (LOESS), Instance-based Algorithms, k-Nearest Neighbor (KNN), Learning Vector Quantization (LVQ), Self-Organizing Map (SOM), Locally Weighted Learning (LWL), Regularization Algorithms, Ridge Regression, Least Absolute Shrinkage and Selection Operator (LASSO), Elastic Net, Least-Angle Regression (LARS), Decision Tree Algorithms, Classification and Regression Tree (CART), Iterative Dichotomizer 3 (ID3), C4.5 and C5.0 (different versions of a powerful approach), Chi-squared Automatic Interaction Detection (CHAID), Decision Stump, M5, Conditional Decision Trees, Naive Bayes, Gaussian Naive Bayes, Causality Networks (CN), Multinomial Naive Bayes, Averaged One-Dependence Estimators (AODE), Bayesian Belief Network (BBN), Bayesian Network (BN), k-Means, k-Medians, K-cluster, Expectation Maximization (EM), Hierarchical Clustering, Association Rule Learning Algorithms, A-priori algorithm, Eclat algorithm, Artificial Neural Network Algorithms, Perceptron, Back-Propagation, Hopfield Network, Radial Basis Function Network (RBFN), Deep Learning Algorithms, Deep Boltzmann Machine (DBM), Deep Belief Networks (DBN), Convolutional Neural Network (CNN), Deep Metric Learning, Stacked Auto-Encoders, Dimensionality Reduction Algorithms, Principal Component Analysis (PCA), Principal Component Regression (PCR), Partial Least Squares Regression (PLSR), Collaborative Filtering (CF), Latent Affinity Matching (LAM), Cerebri Value Computation (CVC), Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), Ensemble Algorithms, Boosting, Bootstrapped Aggregation (Bagging), AdaBoost, Stacked Generalization (blending), Gradient Boosting Machines (GBM), Gradient Boosted Regression Trees (GBRT), Random Forest, Computational intelligence (evolutionary algorithms, etc.), Computer Vision (CV), Natural Language Processing (NLP), Recommender Systems, Reinforcement Learning, Graphical Models, or separable convolutions (e.g., depth-separable convolutions, spatial separable convolutions, etc.).

Figure 4:
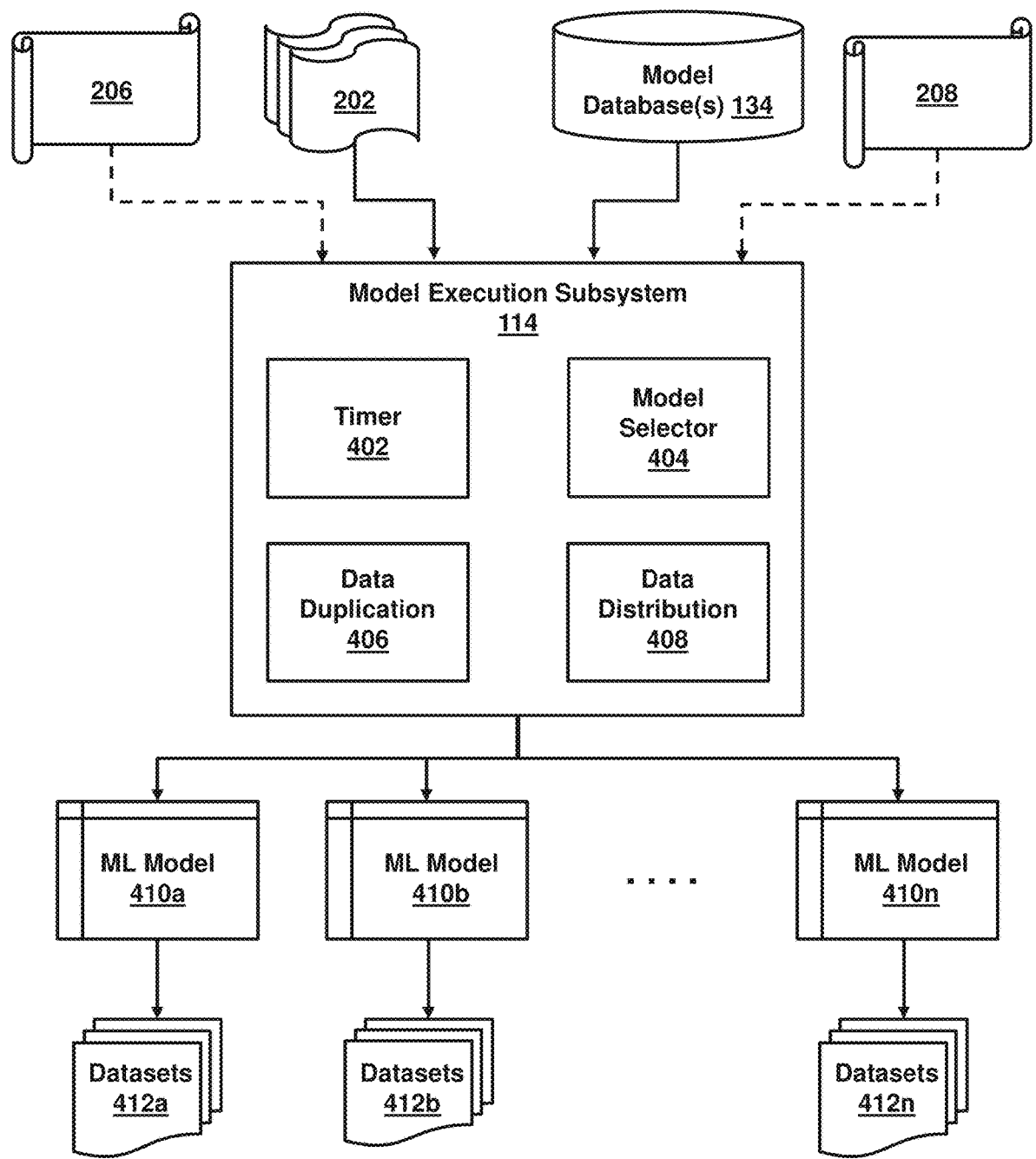
FIG. 4 shows a process for executing one or more machine learning models on production data, in accordance with one or more embodiments.

In some embodiments, model execution subsystem 114 obtains production data 202, an indication of a set of machine learning models that production data 202 is to be executed on, and an indication of whether production data 202 includes any detected changepoints. Model execution subsystem 114 can execute, or facilitate execution of, some or all of the selected machine learning models from the set of machine learning models. As an example, with reference to FIG. 4, model execution subsystem 114 may receive production data 202, an indication from model database 134 of one or more machine learning models that production data 202 is to be executed on, and changepoint indicator 206 or no-changepoint indicator 208. In some cases, model database 134 may provide the machine learning models to be executed in addition to, or instead of, the indication of the machine learning models.

Model execution subsystem 114 may include a set of modules, including a timer 402, a model selector 404, data duplication 406, data distribution 408, other modules, or other components. Each module of model execution subsystem 114 may be implemented by one or more processors executing computer program instructions stored in memory of computer system 102.

In some embodiments, timer 402 is configured to track an amount of time that has elapsed since a machine learning model has executed, an amount of time that has elapsed since production data has been retrieved, or other time periods. As mentioned previously, machine learning models may have various execution frequencies with which each runs. For example, one machine learning model may execute weekly, while another machine learning model may execute monthly. When both of these machine learning models are deployed to a production environment, timer 402 can determine whether a machine learning model is to run and/or when the machine learning model is to run. In some embodiments, timer 402 may be a physical timer having hardware components configured to monitor an amount of time that has elapsed since a particular event (e.g., a spring-based timing mechanism, a quartz clock, etc.), computer software (e.g., an electronic oscillator), or another timing mechanism. When timer 402 determines that a predetermined amount of time has elapsed corresponding to an execution frequency of a machine learning model, timer 402 may be configured to generate a trigger to cause one or more actions facilitating a machine learning model's execution. For example, if the execution frequency of a machine learning model is weekly, timer 402 may determine when seven days has elapsed since the machine learning model executed.

Model selector 404 may be configured to select a particular machine learning model to be run. For instance, model selector 404 may select a machine learning model from model database 134 based on the indication received by model execution subsystem 114, the trigger generated by timer 402, or other aspects. Model selector 404 can identify a model identifier of the models to executed from model database 134. After identifying the model identifier, model selector 404 may select the machine learning model from model database 134 or locate the machine learning model in the production environment such that production data 202 can be provided to the appropriate models.

In some embodiments, two or more machine learning models may be executed on the same production data at the same time. For example, two machine learning models each having a same execution frequency may execute on production data 202. In some cases, data duplication 406 may generate duplicates of the data included in production data 202, and data distribution 408 can distribute each instance of production data 202 to a corresponding machine learning model. For example, machine learning models 410a and 410b may each have a first execution frequency. Each instance of production data 202 may be provided to machine learning models 410a and 410b by data distribution 408 such that machine learning models 410a and 410b can execute on production data 202.

In some embodiments, model execution subsystem 114 is configured to execute certain machine learning models at different times based on whether a changepoint has been detected in production data 202. For example, upon receiving changepoint indicator 206, model execution subsystem 114 may cause machine learning model 410a and machine learning model 410b, each having a first execution frequency, to be executed on production data 202. Machine learning models 410a and 410b may generate output datasets 412a and 412b, respectively, based on production data 202. As another example, upon receiving no-changepoint indicator 208, model execution subsystem 114 may cause machine learning model 410a to execute on production data 202 instead of machine learning model 410b.

As mentioned above, model execution subsystem 114 may cause different machine learning models to execute at different times based on the execution frequency of each machine learning model. In some embodiments, upon timer 402 determining that a first amount of time associated with a first execution frequency of machine learning models 410a and 410b has elapsed, model execution subsystem 114 may cause machine learning models 410a and 410b to execute on production data 202. However, machine learning model 410n (and/or other machine learning models) may not execute because machine learning model 410n has a different execution frequency than machine learning models 410a and 410b. For example, machine learning models 410a and 410b may have a weekly execution frequency, whereas machine learning model 410n may have a monthly execution frequency. In response to timer 402 determining that a second amount of time associated with a second execution frequency of machine learning model 410n has elapsed, model execution subsystem 114 may cause machine learning model 410n to execute on production data 202 to cause datasets 412n to be generated.

In some embodiments, model performance subsystem 116 may be configured to compute a performance score for each machine learning model. The performance score may indicate how well a given machine learning model performed. In some embodiments, the performance score may be compared to prior performance scores of the machine learning model to determine whether the model's performance has improved, stayed the same, or worsened. If the performance of the machine learning model has decreased over time, then this may indicate a need to re-train, rebuild, or replace that machine learning model.

Figure 5:
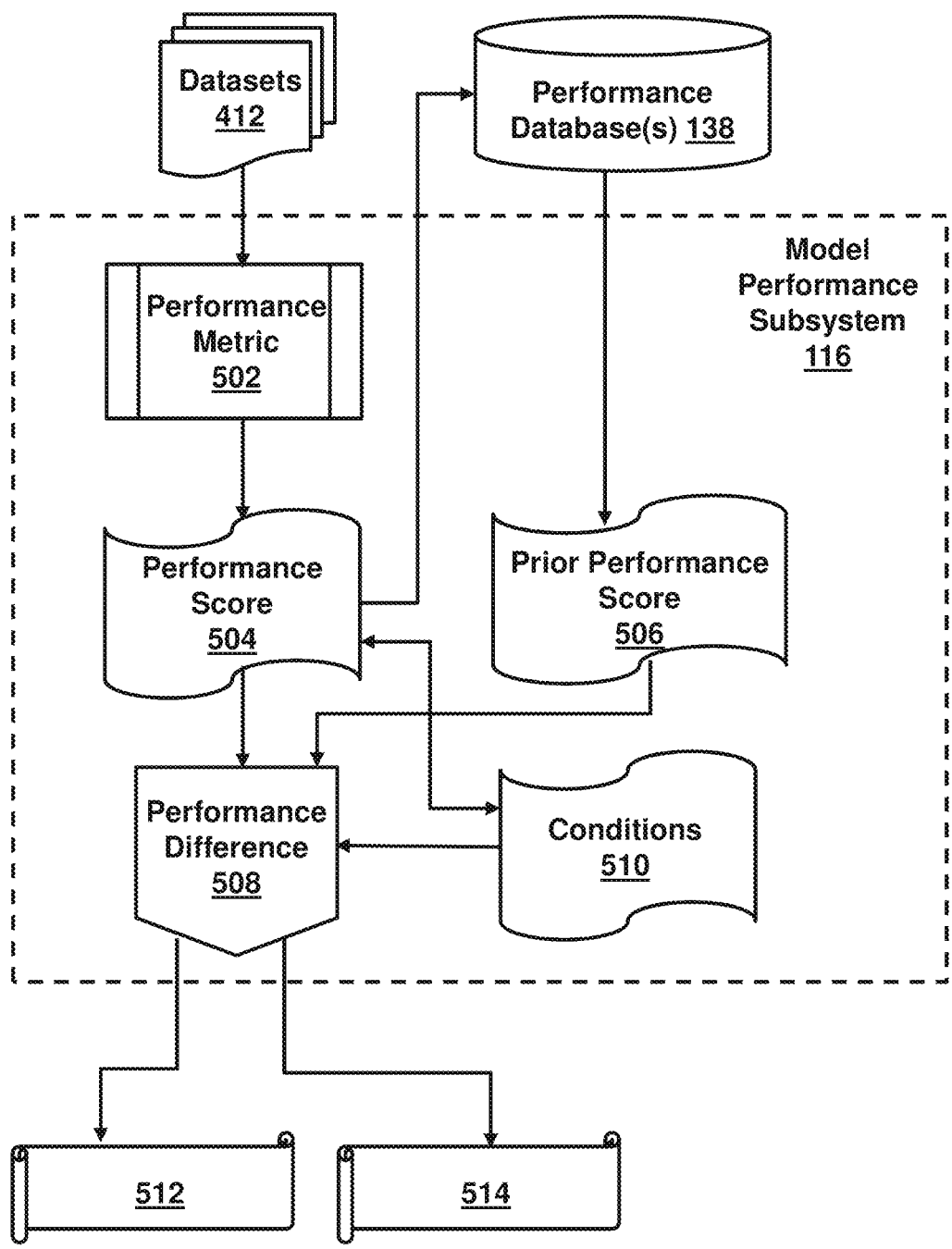
FIG. 5 shows a process for computing a performance score of a machine learning model, in accordance with one or more embodiments.

As an example, with reference to FIG. 5, model performance subsystem 116 may obtain datasets 412 (e.g., one or more of datasets 412a-412n) from model execution subsystem 114. Datasets 412 may be provided to model performance subsystem 116 upon generation by a given machine learning model. In some cases datasets may be stored in local cache until analysis is to be performed. Model performance subsystem 116 may use datasets 412 to determine how well a given machine learning model performed based on historical performance data representing past performance results of that machine learning model (e.g., for previous iterations). Based on the performance of the machine learning model, model performance subsystem 116 may determine any actions to be taken (e.g., retraining, rebuilding, replacement, etc.).

In some embodiments, performance metric 502 may be selected based on the type of machine learning model that produced datasets 412. For example, if machine learning model 410a is a recurrent neural network (RNN), then performance metric 502 may be a residuals metric. Performance metric 502 may be included in a set of performance metrics selected in advance such that any datasets produced by a machine learning model during deployment are to have those performance metrics computed. The various types of performance metrics include, but are not limited to (which is not to suggest that other listings are limiting), residuals, variance, bias, or other metrics. Upon receiving datasets 412, model performance subsystem 116 may compute a performance metric 502. In some cases, multiple performance metrics may be computed in parallel or sequentially for datasets 412 using a multi-thread computing environment. Furthermore, one or more performance metrics may be performed in parallel or sequentially for multiple instances of datasets 412 using the multi-thread computing environment. For example, residuals may be computed for datasets 412a and 412b, produced by machine learning models 410a and 410b, respectively, where the residuals may be computed using separate computing threads of the multi-thread computing environment. A performance score 504 may be obtain upon computing performance metric 502. Performance score 504 may be a numerical value (e.g., a number between 0-100, a number between 0-1, etc.), a percentage, or other representation. Each performance score 504 may be stored in performance database 138 for subsequent machine learning model analysis. In some embodiments, upon generation, performance score 504, a timestamp of (i) when the performance score was generated, (ii) datasets 412 were generated, and/or (iii) when a corresponding machine learning model executed, an indication of the machine learning model, a type of machine learning model, or other information associated with datasets 412, may be provided to performance database 138 for storage. Performance database 138 may store each performance score 504 in a data structure associated with the corresponding machine learning model that produced datasets 412 so that future analysis of performance scores can be easily retrieved.

In some embodiments, model performance subsystem 116 may retrieve a prior performance score 506 for a machine learning model, which can be used to determine whether the machine learning model's performance has improved, stay consistent, or degraded in a current iteration. For example, prior performance score 506 may represent a performance score computed for machine learning model 410a prior to a most recent training and deployment of machine learning model 410a. In response to obtaining datasets 412a from machine learning model 410a, output based on machine learning model 410a being executed on production data 202 during a current deployment cycle, model performance subsystem 116 may access performance database 138 and retrieve prior performance score 506 reflecting a previously computed performance score of machine learning model 410a during a previous deployment cycle. In some embodiments, prior performance score 506 may be an aggregation of multiple prior performance scores for a corresponding machine learning model. For example, prior performance score 506 may be an average of performance scores computed for a machine learning model for each previous deployment cycle.

Performance score 504 and prior performance score 506 may be compared to determine a performance difference 508. Performance difference 508 may indicate a change in performance of a machine learning model from one deployment cycle to another. For example, during a previous deployment cycle, a machine learning model may have a first performance score S1 (e.g. prior performance score 506). During a current deployment cycle, the machine learning model may have a second performance score S2 (e.g., performance score 504). Performance difference 508 may indicate a difference between first performance score S1 and second performance score S2 (e.g., S2–S1). While the aforementioned example uses a performance "difference," it should be understood by those of ordinary skill in the art that other comparison techniques may be used to determine how a current performance score compares to a previous performance score or scores.

In some embodiments, model performance subsystem 116 may determine whether performance difference 508 satisfies one or more conditions 510. As an example, one of conditions 510 may be satisfied if performance difference 508 is less than or equal to a threshold performance score. In such a scenario, model performance subsystem 116 may generate and output an indicator 512 indicating that a performance of the current version of the machine learning model has not changed by more than a threshold amount with respect to a previous version's performance. In some cases, indicator 512 being output may indicate that a current machine learning model does not need to be retrained, rebuilt, or replaced. As another example, one of conditions 510 may be satisfied if performance difference 508 is greater than a threshold performance score. In such a scenario, model performance subsystem 116 may generate and output an indicator 514 indicating that a performance of the current version of the machine learning model has changed by more than the threshold amount with respect to the previous version's performance. In some cases, indicator 514 being output may indicate that a current version of the machine learning model should be retrained, rebuilt, or replaced.

In some embodiments, one of conditions 510 may be satisfied if performance score 504 is less than or equal to a threshold performance score. For example, if performance score 504 is less than a threshold performance score, then model performance subsystem 116 may generate and output indicator 514 (e.g., the machine learning model is to be retrained, rebuilt, or replaced). As another example, that one of conditions 510 not being satisfied, or a different condition being satisfied, includes performance score 504 being greater than the threshold performance score, then model performance subsystem 116 may generate and output indicator 512 (e.g., the machine learning model may not need to be retrained, rebuilt, or replaced).

Production data, such as production data 202, may include a plurality of data items representing one or more feature sets. For example, production data 202 may include a stream of credit card applications, and each credit card application may include information such as an applicant's annual salary, residence, employment history, and the like. The information included by each credit card application may represent a feature set, and thus the production data may include a plurality of data items representing various feature sets. In some embodiments, the production data may include feature sets, however it may not include observed results corresponding to the feature sets. In some embodiments, the production data may include feature sets and observed results corresponding to the feature sets, however the observed results may be masked so as to not be input to the machine learning model (e.g., one of machine learning models 410a-410n).

As mentioned above, machine learning models 410a-410n may be configured to take, as input, production data 202 and generate output datasets 412a-412n, respectively, which may be generated based on the feature sets included in production data 202. Output datasets 412a-412n may represent predictions from a respective one of machine learning models 410a-410n for each feature set input to that machine learning model. In some embodiments, model performance subsystem 116 may be configured to compute performance score 504 for a corresponding machine learning model (e.g., one or more of machine learning models 410a-410n) based on the output datasets (e.g., a respective one or more of output datasets 412a-412n) and production data 202. For example, model performance subsystem 116 may determine performance difference 508 between observed results and output datasets 412. Based on the difference and a number of feature sets included by production data 202, performance score 504 of a corresponding machine learning model may be determined.

In some embodiments, model performance subsystem 116 may determine whether the computed accuracy score for the machine learning model satisfies one or more of conditions 510. For example, one of conditions 510 may be a threshold accuracy condition satisfied if performance score 504 is less than a threshold performance score, as mentioned above. As another example, the threshold accuracy condition may be satisfied if performance score 504 is greater than or equal to a threshold accuracy score. In some embodiments, the threshold performance score may be determined based on prior performance score 506 previously determined for a corresponding machine learning model during the training process. For instance, during training, a machine learning model may have been determined to have an accuracy score of S1 based on validation data. The threshold performance score for the machine learning model based on production data 202 may be determined using accuracy score S1. In some embodiments, the threshold performance score may be the same or similar to accuracy score S1. For example, if accuracy score S1 is 80% (e.g., indicating that, during training, the machine learning model successfully predicted 80% of the results of the test data), the threshold performance score may be 80% +/−$\delta$, where $\delta$ is a configurable value depending on the particular machine learning model. For example, $\delta$ may be 2% or more, 5% or more, 10% or more, or other values.

Some embodiments include using some of production data 202 to generate updated training data. In some embodiments, the updated training data to re-train the machine learning model that produced output datasets 412, to generate a new instance of that machine learning model, or to generate a new machine learning model.

In some embodiments, model performance subsystem 116 may be configured to compute residuals between predicted results and observed results, such as observed results from production data 202. Residuals represent a difference between what is actually detected and what is predicted. For example if, for a machine learning model configured to predict a credit score for a given credit application, a predicted credit score is 700 and an actual credit score is 750, then the residual would be 50. In some embodiments, a graphical representation of the residuals may be generated to identify which feature or features contribute most or least to residuals. For example, the residuals may indicate that geographical location affects a credit score greater than expected or desired. In such cases, the machine learning model may, during a rebuild or subsequent training, or during deployment, modify one or more parameters (e.g., hyperparameters) to decrease or increase the effect of geographical location on credit score predictions. In some embodiments, an accuracy of the trained machine learning model may be determined based on the residuals. For instance, because the residuals reflect the difference between the predicted results and the observed results for a machine learning model, the accuracy score of the machine learning model may also be determined based on the residuals.

In some embodiments, a contribution to the residuals for each feature of a plurality of features represented by the production data may be determined. For example, a feature set, representing features F1 and F3, may be associated with an observed result. Furthermore, the feature set may, when input to a machine learning model, cause the machine learning model to produce predicted result (e.g., included in output datasets 412). A contribution to the residual (e.g., the difference between the predicted result and the observed result) for both features F1 and F3 may be determined to identify whether feature F1 and/or feature F3 contribute to the residuals by more than a threshold amount. In some embodiments, if it is determined that a contribution to the residuals of one or more of the features included by the feature sets of the production data is equal to or greater than a threshold amount of contribution for residuals, model performance subsystem 116 may generate indicator 514 to cause the training data to be updated and/or cause the machine learning model to be rebuilt. As an example, the threshold amount of contribution for the residuals may be greater than 5%, greater than 10%, greater than 20%, or other amounts. For instance, if feature F1's contribution to the residuals is greater than the threshold amount of contribution (e.g., feature F1 contributes to the residuals by more than 5%), then this may indicate that training data should be updated, and/or the machine learning model should be rebuilt.

Depending on the configuration of model performance subsystem 116, one or more of conditions 510 being satisfied may be sufficient to cause indicator 512 or 514 to be generated. Thus, although multiple scenarios are described above, persons of ordinary skill in the art will recognize that each of conditions 510 need not be satisfied in order for computer system 102 to perform a subsequent action.

In some embodiments, replacing the machine learning model may include causing a new machine learning model to be built. The new machine learning model may have similar features as the original machine learning model (e.g., same or similar hyperparameters, execution frequency, model type, etc.), or the features may differ. For example, performance score 504 may be generated based on datasets 412, generated by one of machine learning models 410*a*-410*n*. If each of machine learning models 410*a*-410*n* have a same execution frequency (e.g., weekly execution frequency), then in response to determining that a particular one or more of conditions 510 has/have been satisfied, model performance subsystem 116 may determine that a new machine learning model having a different execution frequency (e.g., monthly execution frequency) is to be built. In some embodiments, replacing the machine learning model may include promoting one machine learning model from being a secondary machine learning model to be a primary machine learning model, while demoting the previous primary machine learning model to now be a secondary machine learning model. For example, if two or more machine learning models are part of a champion-challenger scenario, then satisfying one of conditions 510 may include making one of the challenger machine learning models the champion and making the previous champion machine learning model a challenger.

Some embodiments include performing a side-by-side comparison of one machine learning model against another machine learning model (or multiple machine learning models). For example, a performance score of machine learning model 410*a* may be compared in parallel to a performance score of machine learning model 410*b*. As different machine learning models take, as input, different parameters, one machine learning model performing poorly on the production data may indicate that that machine learning model needs to be rebuilt, retrained, or replaced because of the types of features included in the production data. For example, machine learning model 410*a* may employ a first type of feature to generate datasets 412*a* while machine learning model 410*b* may employ a second type of feature to generate datasets 412*b*. If a performance score for machine learning model 410*a* is greater than a performance score for machine learning model 410*b*, such as by more than a threshold amount, then this may indicate that the production data includes irregularities, Null sets, not enough instances of, or other issues, with respect to the second type of feature. If it is determined that a particular type of feature included in the production data causes problems, and that some machine learning models take, as input, that type of feature, then those machine learning models may be avoided or replaced with other machine learning models that do not take, as input, that type of feature.

Figure 6:
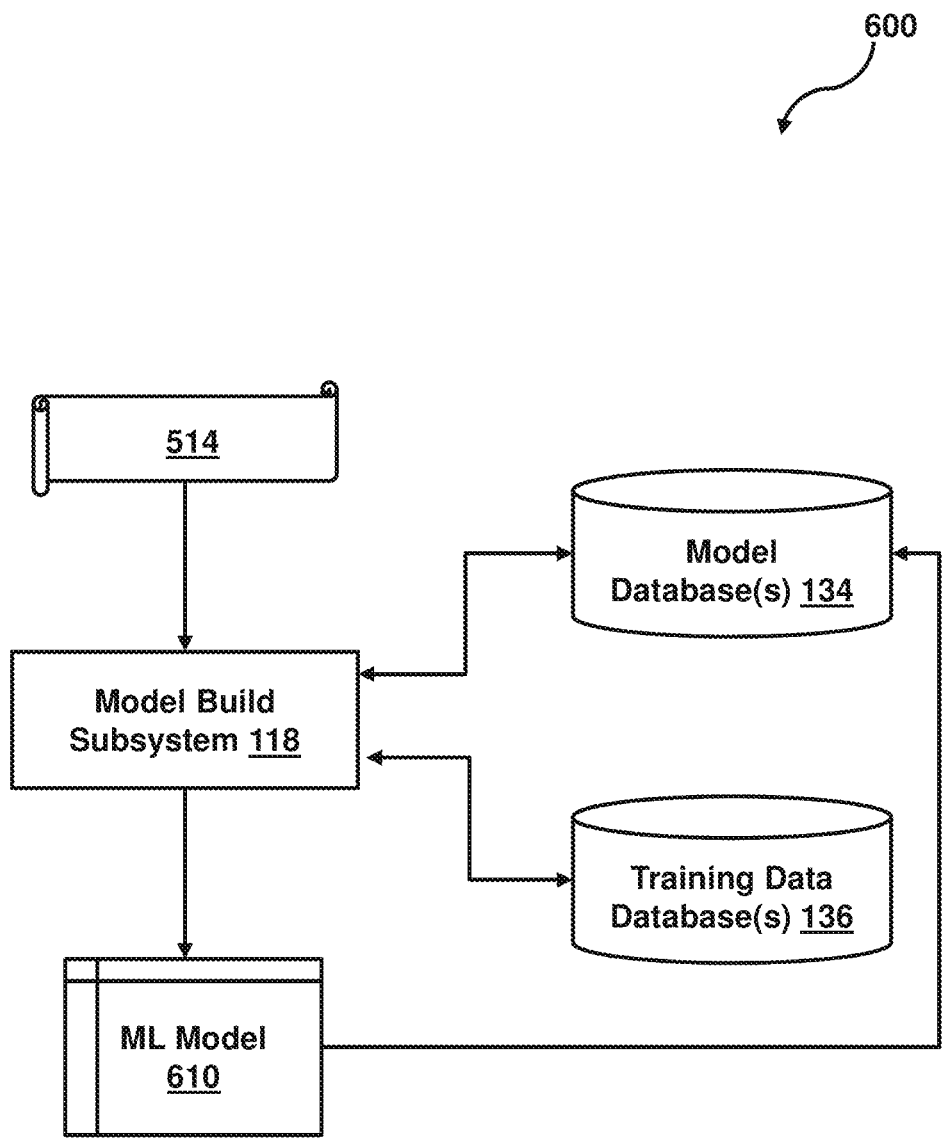
FIG. 6 shows a process for building a machine learning model, in accordance with one or more embodiments.

In some embodiments, model build subsystem 118 may be configured to build, train, or facilitate replacement of one or more machine learning models. For example, if model performance subsystem 116 outputs indicator 514, indicating that a new machine learning model is to be built based on another machine learning model satisfying one of conditions 510, model build subsystem 118 may facilitate building the new machine learning model. As an example, with reference to FIG. 6, process 600 describes an example for building a machine learning model in response to determining that a performance score of a different machine learning model satisfies one or more conditions. As seen FIG. 6, process 600 includes model build subsystem 118 receiving indicator 514 generated and output by model performance subsystem 116. Upon receipt of indicator 514, model build subsystem 118 may determine a type of machine learning model to be built and data to be retrieved to train and validate the machine learning model to be built. Some embodiments include obtaining a design specification indicating a type of machine learning model to be built, a source with which data for training the machine learning model is to be retrieved from, model parameters to be tuned by the training process, a number of machine learning models to be built, and/or other information.

In some embodiments, the model parameters represent features or types of features for the machine learning model to be trained. A feature represents a variable that serves as an input to a model and is used by the model to make predictions. In some embodiments, features may be orthogonal to one another. For example, each feature may occupy a dimension of an n-dimensional feature space. The model parameters, in some cases, may indicate the types of features represented by data used to train the machine learning model, as well as the type of features expected to be represented by the production data input to the trained machine learning model. As an example, data including features, such as noise ratios, lengths of sound, relative power, etc., may serve as an input to a prediction model related to recognizing phonemes for speech recognition processes. As another example, data including features such as edges, objects, pixel information, may serve as an input to a prediction model related to computer vision analysis. As still yet another example, data including features, such as income, credit score, and biographical information may serve as an input to a prediction model related to financial applications. Each of the features (e.g., noise rations, lengths of sound, relative power, edges, objects, income, credit score, biographical information, or other features) may be different types of features. The feature type may relate to the genre of the prediction model (e.g., speech recognition models, computer vision models, etc.) or the different individual fields encompassed by a feature (e.g., length of sounds in units of time, income in units of dollars, etc.). As described herein, a feature type corresponds to a type of feature (e.g., what the feature represents). For example, the feature type "salary information" may correspond to the feature "salary," which may be used as a model input parameter to a financially-related prediction model. In some embodiments, the model parameters may also indicate hyperparameters associated with the trained machine learning model. A hyperparameter represents a configurable variable whose value is estimated by a model based on input data. As an example, for a PCA model, a number of components to keep represents one type of hyperparameter.

The model parameters may indicate distributions, trends, value ranges, or other aspects, of the features included within data to be input to a machine learning model. In some embodiments, training data used to train the machine learning model may have a particular distribution of features (e.g., the training data includes a first percentage of a first type of feature, a second percentage of a second type of feature, and so on). Based on the particular distribution of features of the training data, production data to be input to a trained machine learning model is expected to also include a same or similar distribution of features. If so, then the trained machine learning model should perform accurate predictions. However, if the distribution of features of data to be input to the trained machine learning model differs from the distribution of features of included in the training data used to train the machine learning model, then the predictions of the trained machine learning model may not be accurate.

The type of model to be built may be specified based on one or more of a type of machine learning model used to produce datasets 412 with which caused indicator 514 to be produced, a type of data to be analyzed upon deployment of the model, or other factors. For instance, indicator 514 may include metadata specifying the type of model that produced datasets 412. Based on the design specification, model build subsystem 118 may retrieve computer code, software, scripts, or other data needed to build the new machine learning model from model database 134. Furthermore, based on the design specification, model build subsystem 118 may retrieve build data from training data database 136 to be used to build the new machine learning model. The build data may include training data and validation data. In some embodiments, the build data may be generated based on historical data, such as previous production data that machine learning models have been executed on. The training data is used to train the machine learning model, such as tuning model parameters to specific values. The validation data is used to determine how well the model has been trained. For example, the validation data can include known results and inputs that, if the model is trained accurately, are expected to produce the known results. In some embodiments, training may be completed when the accuracy of the model, tested with the validation data, equals or exceeds an accuracy threshold. For instance, model build subsystem 118 may output machine learning model 610 for deployment or further analysis in response to determining that the training process has been completed. Machine learning model 610 may also be stored in model database 134 for retrieval and use during subsequent deployment cycles.

Models stored in model database 134 be trained, or re-trained, periodically, such as every day, every week, every month, or at other intervals. Model build subsystem 118 may retrieve training data from training data database 136 for training a given machine learning model, where the particular training data used may vary depending on the machine learning model that is being trained. For example, an object recognition model may be trained using images of objects. As another example, a credit scoring model may be trained using credit applications. Some embodiments include training data having labels for each data item indicating an expected result for the machine learning model. For example, an object recognition model may be trained using images of objects including labels indicating a category of object that each image represents. This may allow the machine learning model to adaptively "learn" by computing residuals between the predicted results and the observed results (e.g., the results that would have been obtained if the machine learning model operated without error), and subsequently altering values of various hyperparameters of the machine learning model to try and minimize the residuals.

The model build process performed by model build subsystem 118 includes multiple steps including (1) a data pull process; (2) a feature engineering process; (3) a model build process; and (4) a model scoring process. In some embodiments, an additional data splitting process may be performed, as described below.

The data pull process may include retrieving the training data from training data database 136 for training a machine learning model. In some embodiments, build data may be generated from the training data retrieved from training data database 136. The training data may be split to segment the retrieved data into training data and validation data, which is also referred to herein interchangeably as test data. The training data may be used to train the machine learning model, whereas the validation data may be used to test an accuracy of the trained machine learning model. The data splitting process generally includes selecting at least some of data sets from training data database 136 and designating some of the selected data sets as training data and designating other of the selected data sets as validation data. In some embodiments, the training data and the validation data may be labeled data (e.g., data items including labels representing expected outcomes). For example, a data item included by the training data may represent a credit card application and the label associated with the data item may be an indication of whether the credit card application should be approved or denied. In some embodiments, the labels may be metadata associated with the training data and the validation data.

In some embodiments, the feature engineering process may include refining the training data such that the data represents features needed for input to the machine learning model to be trained. The feature engineering process may also refine the validation data in a similar manner. In some embodiments, the feature engineering process may use domain knowledge associated with the machine learning model to be trained to extract features from the training data relevant to the machine learning model. The extracted features can be used to improve the performance of the machine learning algorithms.

In some embodiments, the model build process may include training a selected machine learning model with the training data. The model build process may take the training data as inputs for the selected machine learning model, which may provide outputs that can be fed back to the machine learning model as input to train the machine learning model (e.g., alone or in conjunction with user indications of the accuracy of the outputs, labels associated with the inputs, or with other reference feedback information). In some embodiments, the model build process may cause, or otherwise facilitate, the machine learning model to update its configurations (e.g., weights, biases, or other parameters) based on its assessment of its prediction and reference feedback information (e.g., user indication of accuracy, reference labels, or other information). In some embodiments, where the machine learning model is a neural network, connection weights may be adjusted to reconcile differences between the neural network's prediction and the reference feedback. Some embodiments include one or more neurons (or nodes) of the neural network requiring that their respective errors be sent backward through the neural network to them to facilitate the update process (e.g., back-propagation of error). Updates to the connection weights may, for example, be reflective of the magnitude of error propagated backward after a forward pass has been completed. In this way, for example, the machine learning model may be trained to generate better predictions.

In some embodiments, the model scoring process may include testing the accuracy of the built machine learning model to determine whether the machine learning model has been properly trained. For example, the model scoring process may cause the built machine learning model to take, as input, the validation data, and may compare the outputs of the built machine learning model to the results indicated by the labels associated with validation data. If the model scoring process does not yield positive results the machine learning model may be re-trained with new training data and scored, with this process repeating until the model is capable of accurately predicting results for the validation data (or new validation data). For example, the model scoring process may compute an accuracy score for the predicted outputs of the built machine learning model based on a comparison of the outputs from the built machine learning model and the results stored as labels with the validation data. If the accuracy score of the built machine learning model satisfies a threshold training condition, such as the accuracy score being greater than or equal to a threshold training score, then the model scoring process may output the trained machine learning model.

Figure 7:
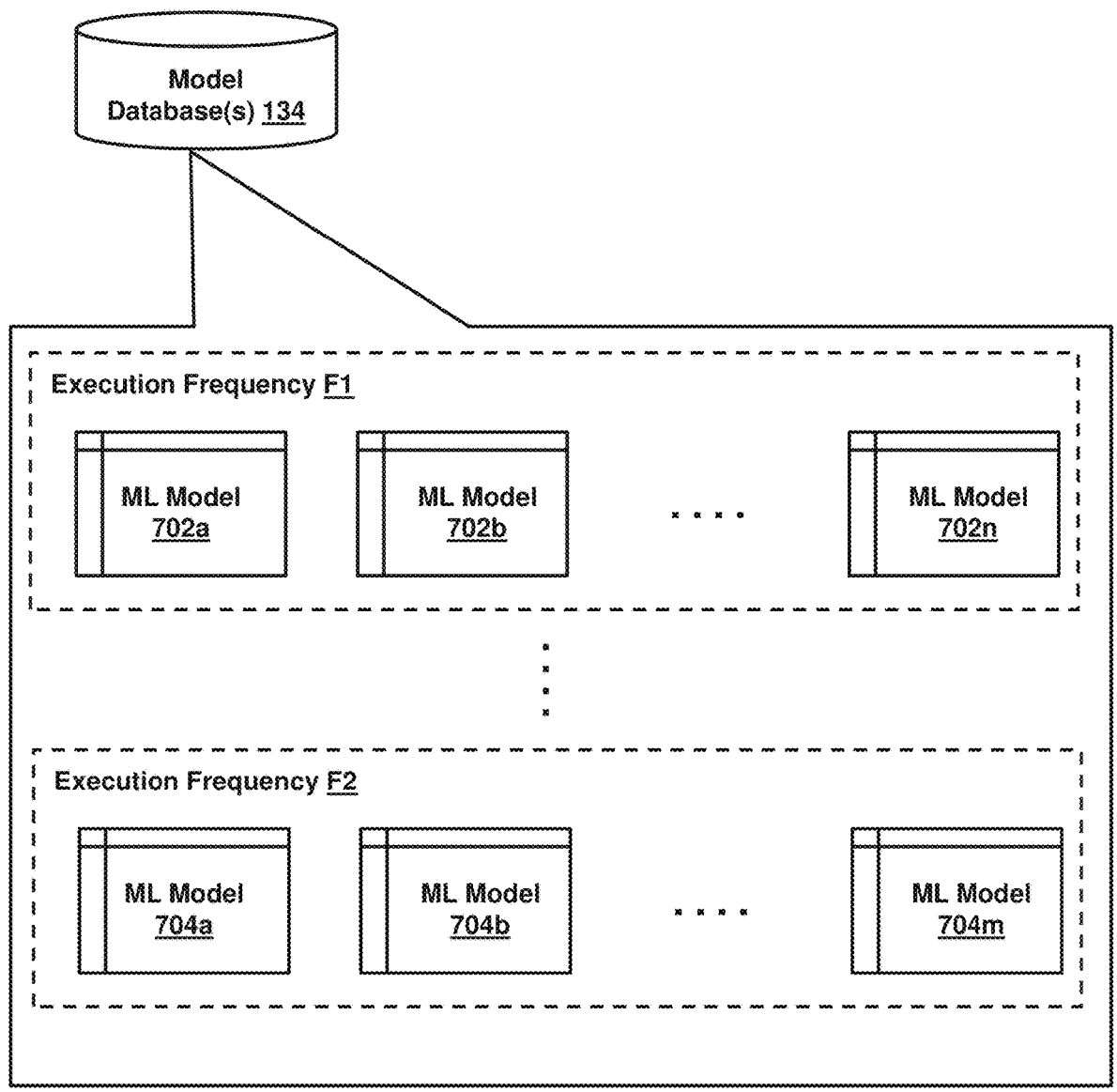
FIG. 7 shows a database storing machine learning models having various execution frequencies, in accordance with one or more embodiments.

FIG. 7 shows a database storing machine learning models having various execution frequencies, in accordance with one or more embodiments. Model database 134 may include multiple sets of machine learning models, each of which may have a different execution frequency, purpose. For example, model database 134 includes a first set of machine learning models 702a-702n, each having a first execution frequency, F1, and may also include a second set of machine learning models 704a-704m, each having a second execution frequency, F2. For example, first execution frequency F1 may be an hourly, daily, weekly, or other frequencies with which machine learning models 702a-702n execute. Second execution frequency F2 may be weekly, monthly, bi-monthly, quarterly, yearly, or other frequencies with which machine learning models 704a-704m execute. Although only two sets of machine learning models having two different execution frequencies are included in model database 134, additional sets of machine learning models having different execution frequencies may be stored in model database 134. The number of machine learning models included in the first set of machine learning models may be the same or different than the number of machine learning models included in the second set of machine learning models. For example, each set of machine learning models may include one or more machine learning models, two or more machine learning models, ten or more machine learning models, or other numbers of machine learning models.

In some embodiments, when a changepoint has been detected in production data, a particular set of machine learning models may be executed on the production data. For example, machine learning models 702a-702n may be executed on the production data in response to a changepoint being detected. In some embodiments, in response to determining that a performance score of one or more of machine learning models 702a-702n is less than a threshold performance score, one or more of machine learning models 704a-704m may be executed on the production data. Newly built or newly trained models may also be stored in model database 134. In some embodiments, the newly built models may be stored with other machine learning models having a same or similar execution frequency. For example, if a newly built machine learning model, such as one built in response to the performance score of one or more of machine learning models 702a-702n being less than a threshold performance score, has an execution frequency F2, then the newly built machine learning model may be added to machine learning models 704a-704m.

Example Flowcharts

Figure 8A:
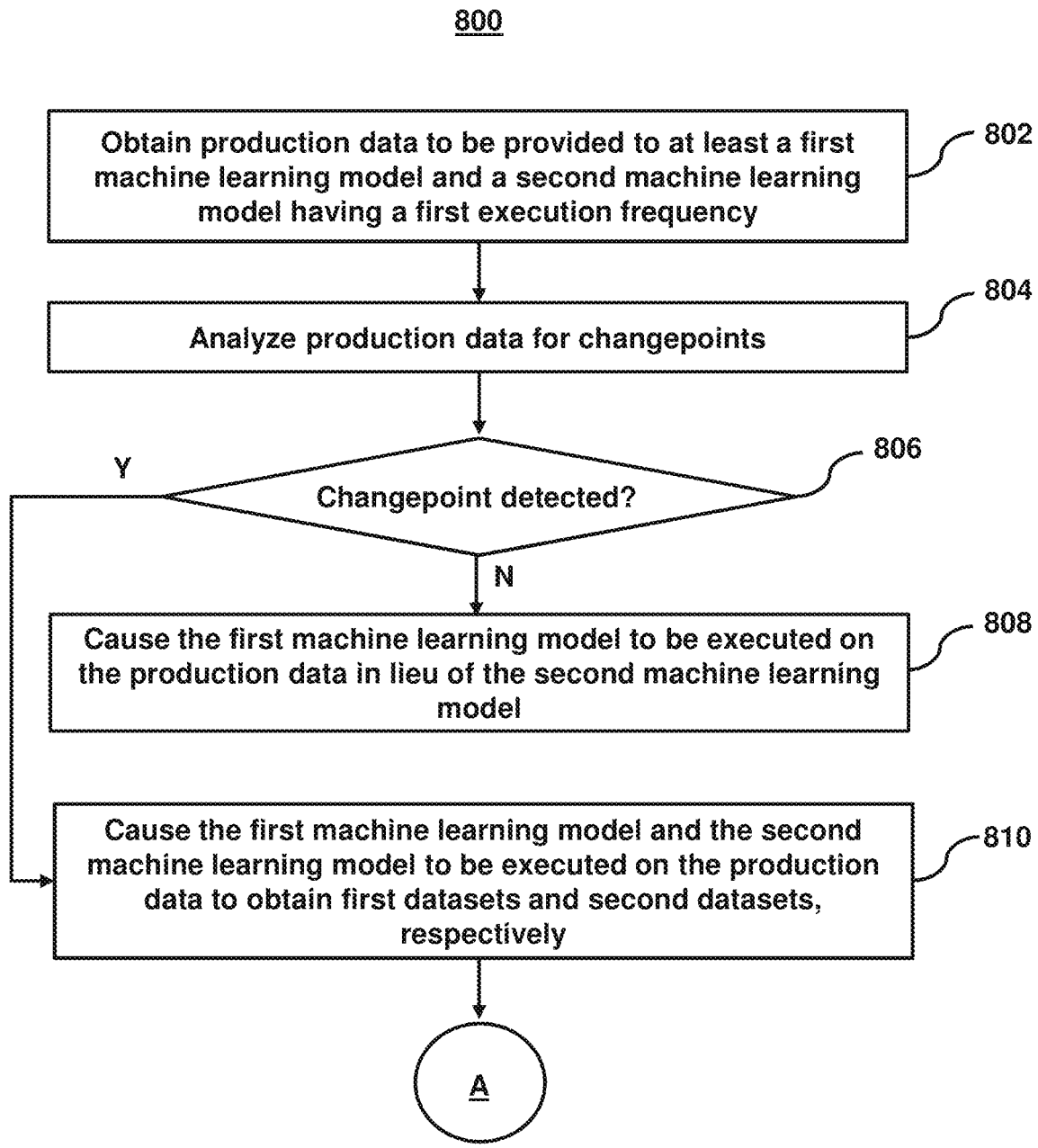
FIGS. 8A and 8B show flowcharts of a method for determining a machine learning model to execute based on results of other machine learning models, in accordance with one or more embodiments.
Figure 8B:
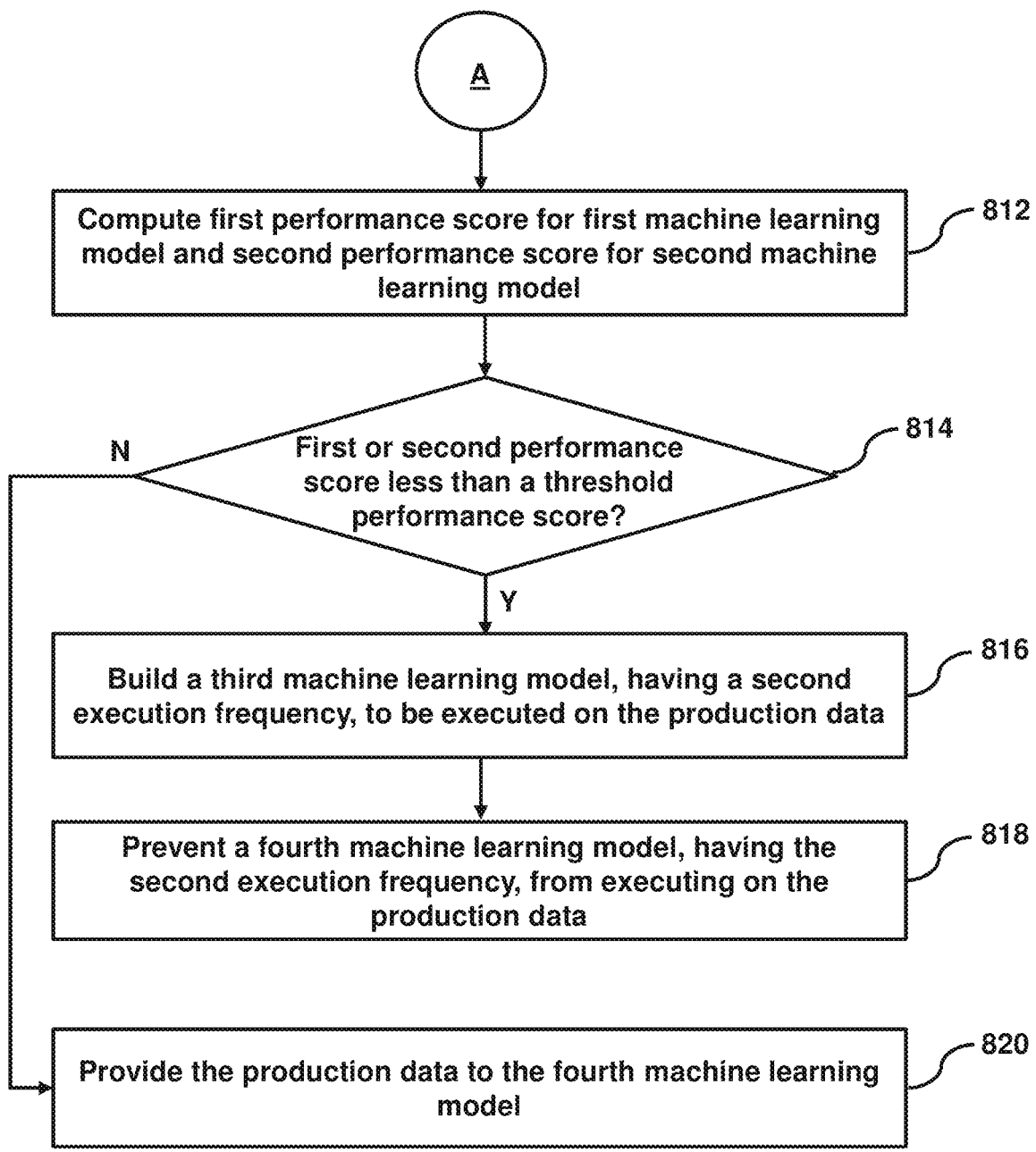
Figure 9:
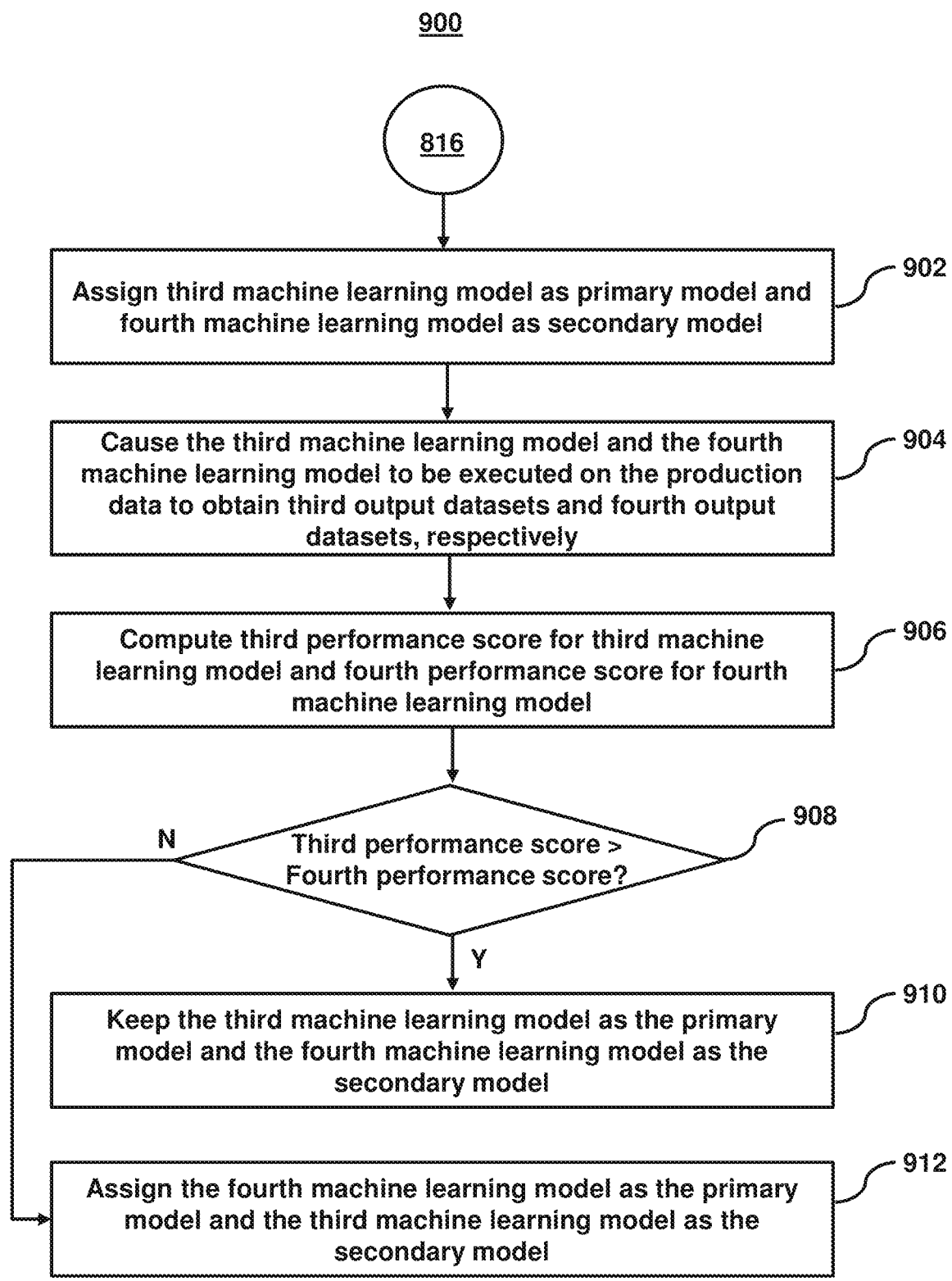
FIG. 9 shows a flowchart of a method for assigning machine learning models to be a primary model or a secondary model, in accordance with one or more embodiments.

FIGS. 8A-8B and 9 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIGS. 8A and 8B show flowcharts of a method 800 for determining a machine learning model to execute based on results of other machine learning models, in accordance with one or more embodiments. Method 800 may begin at an operation 802. In operation 802, production data to be provided to at least a first machine learning model and a second machine learning mode, each having a first execution frequency, may be obtained. In some embodiments, the first machine learning model and the second machine learning model are selected based on each having a first execution frequency (e.g., executing daily, weekly, etc.). In some embodiments, the first machine learning model and the second machine learning model are part of, or form, a set of machine learning models that are to initially be executed on production data. The production data obtained may also be provided to other machine learning models having a different execution frequency (e.g., monthly, quarterly, etc.). In some embodiments, the production data may be obtained via a data feed, such as data feed 140. The data feed may be configured to receive updated application data from one or more real-time applications. In some embodiments, the production data may be stored in production data database 132 prior to, in parallel to, or after being provided to computer system 102. The production data may be retrieved in some cases from production data database 132 instead of from data feed 140. In some embodiments, operation 802 may be performed by a subsystem that is the same or similar to changepoint detection subsystem 112.

In an operation 804, the production data may be analyzed for changepoints. A changepoint represents instances of data abruptly shifting in some manner. In particular, changepoints may represent abrupt shifts in time series data (e.g., data that is sequential in time). A goal of changepoint detection is to identify a location (e.g., a time) that a particular changepoint or changepoints occurred in the data, as well as determining a number of changepoints in the data. The production data, such as production data 202, may represent time series data as described above with respect to Equation 1. The time series data may be multi-dimensional, including multiple variables (e.g., a price of an item, a salary, a credit score, a grayscale value, etc.), some of which may be independent variables, while others may be correlated. Thus, changepoints, which represent abrupt changes in a value of the data, may occur in one or more dimensions. In some embodiments, analyzing the production data for changepoints may include identifying candidate multiple changepoint configurations in the production data 202, which may each be referred to as a model or candidate model. Model selection may be based on the BDML framework, and may include computing a BDML score for each candidate model and selecting the candidate model having a smallest BDML score. All changepoints included in the selected candidate model may be classified as detected changepoints. Some examples of changes that can occur are shifts in a mean value of the data and/or shifts in a slope of the data. For instance, the production data can include different regimes which will have one mean and slope value before a given changepoint and a different mean and slope value after the changepoint. In some embodiments, operation 804 may be performed by a subsystem that is the same or similar to changepoint detection subsystem 112.

In an operation 806, a determination may be made as to whether any changepoints have been detected within the production data. In some embodiments, changepoints may be detected using the BDML framework, however other frameworks may be used in addition to or in lieu of the BDML framework. For example, an object BDML framework or "oBDML" framework may be used, an MDL framework, or a BIC framework may be used. Additional details regarding the various techniques capable of being used to detect changepoints within multivariant data, such as production data as detailed herein, is described in Li et al., "Multiple Changepoint Detection with Partial Information on Changepoint Times," 2019, the disclosure of which is incorporated herein by reference in its entirety. In some embodiments, operation 806 may be performed by a subsystem that is the same or similar to changepoint detection subsystem 112.

If, at operation 806, it is determined that no changepoints have been detected in the production data, then method 800 may proceed to operation 808. In operation 808, the first machine learning model may be caused to execute on the production data in lieu of the second machine learning model. For example, as mentioned above, the production data obtained at operation 802 is for the first machine learning model and the second machine learning model, which both have a same execution frequency (e.g., a first execution frequency). Prior to the production data being provided to, or executed on by, the first or second machine learning model, the changepoint detection processes may be performed to determine whether the production data includes any instances of a changepoint. After determining that no changepoints are detected in the production data, the production data may then be provided to, and executed on by, the first machine learning model. In some embodiments, if no changepoints are detected in the production data, the production data may still be provided to the second machine learning model, however the second machine learning model may not execute on the production data (e.g., may be prevented from executing). In some embodiments, operation 808 may be performed by a subsystem that is the same or similar to changepoint detection subsystem 112.

If, however, at operation 806, it is determined that one or more changepoints are detected in the production data, method 800 may proceed to operation 810. In operation 810, the first machine learning model and the second machine learning model may be caused to execute on the production data. The first machine learning model executing on the production data may cause first datasets to be obtained, and the second machine learning model executing on the production data may cause the second datasets to be obtained. For example, in response to detecting at least one changepoint in production data 202, machine learning model 410a may be executed on production data 202 to obtain output datasets 412a and machine learning model 410b may be executed on production data 202 to obtain output datasets 412b. In some embodiments, operation 810 may be performed by a subsystem that is the same or similar to model execution subsystem 114.

In some embodiments, method 800 may proceed from operation 810 to operation 812, depicted in FIG. 8B.

In operation 812, a first performance score may be computed for the first machine learning model and a second performance score may be computed for the second machine learning model. In some embodiments, the performance scores may be computed based on the output datasets generated by a corresponding machine learning model. For example, a first performance score (e.g., performance score 504) may be computed for machine learning model 410a based on output datasets 412a, and a second performance score may be computed for machine learning model 410b based on output datasets 412b. In some embodiments, a type of performance metric may be selected in advance of the performance score being computed, where the type of performance metric is selected based on a type of machine learning model that the corresponding output datasets were produced by, a goal of the machine learning model, or other factors. The performance metrics that may be computed to obtain the performance score may include a mean, variance, bias, or other performance metric. In some embodiments, operation 812 may be performed by a subsystem that is the same or similar to model performance subsystem 116.

In an operation 814, a determination may be made as to whether the first or second performance is less than a threshold performance score. In some embodiments, the threshold performance score may be determined based on previous performance scores for the first machine learning model, the second machine learning model, other machine learning models, combinations of machine learning models, or other performance scores. The threshold performance score may be configured by a system administrator (e.g., a user of client device 104, computer system 102, or other components of system 100), and may be dynamically adjusted during operation. If the performance score of either the first machine learning model or the second machine learning model is less than the threshold performance score, this may indicate that the production data may cause problems to arise if executed on by other machine learning models. For example, other machine learning models have different execution frequencies than those of the first and second machine learning models. Thus, detecting performance issues with the first and second machine learning models for the production data can help prevent problems arising with other machine learning models that would otherwise execute on the production data, even if those machine learning models have not done so yet. In some embodiments, operation 814 may be performed by a subsystem that is the same or similar to model performance subsystem 116.

If, at operation 814, it is determined that either the first or second performance score is less than the threshold performance score, then method 800 may proceed to operation 816. In operation 816, a third machine learning model may be built or caused to be built. The third machine learning model is to have a second execution frequency different than the first execution frequency, and is to be executed on the production data. For example, the third machine learning model may be built to have an execution frequency of monthly (e.g., executes monthly) whereas the first and second machine learning models may have an execution frequency of daily (e.g., execute daily). In some embodiments, operation 816 may be performed by a subsystem that is the same or similar to model build subsystem 118.

In operation 818, a fourth machine learning model, having the second execution frequency, may be prevented from being executed on the production data. By building the third machine learning model to execute on the production data while also preventing the fourth machine learning from executing on the production data, issues that would otherwise arise with the fourth machine learning model are mitigated, thereby saving precious computational resources that can be reallocated to other tasks. In some embodiments, operation 818 may be performed by a subsystem that is the same or similar to model execution subsystem 114, model build subsystem 118, or a combination of model execution subsystem 114 and model build subsystem 118.

If, at operation 814, it is determined that neither the first nor second performance score is less than the threshold performance score, then method 800 may proceed to operation 820. At operation 820, the production data may be provided to the fourth machine learning model. The fourth machine learning model, as mentioned above, may have a second execution frequency different from the execution frequency of the first and second machine learning models. Therefore, the fourth machine learning model may not execute on the production data at a same time as that of the first and second machine learning models. Furthermore, if the first and second performance scores are not less than the threshold performance, then this indicates that the production data will not cause problems when executed on by the fourth machine learning model, and therefore an additional machine learning model may not be necessary. In some embodiments, operation 820 may be performed by a subsystem that is the same or similar to model execution subsystem 114, model build subsystem 118, or a combination of model execution subsystem 114 and model build subsystem 118.

FIG. 9 shows a flowchart of a method 900 for assigning machine learning models to be a primary model or a secondary model, in accordance with one or more embodiments. Method 900 may begin at an operation 902. Prior to operation 902, some of the same or similar operations included in method 800 may be performed. For instance, operations 802-816 may be performed and, subsequent to operation 816, operation 902 may be performed. As an example, in response to building a new (third) machine learning model having a second execution frequency (different than the first execution frequency of the first and second machine learning models of method 800), which is to be executed on the production data, operation 902 of method 900 may be performed.

In operation 902, the third machine learning model (e.g., the newly built machine learning model of operation 816) may be assigned as a primary model and the fourth machine learning model may be assigned to be a secondary model. In some embodiments, the primary model, which may also be referred to as a "champion" model, may be designated for generating prediction data for a particular use case. For example, the champion model may be used to generate prediction data for a business use, decision making process, or other purpose. The secondary model, which may also be referred to as a "challenger" model, may be designated for generating prediction data for evaluation. The prediction data for evaluation may not necessarily be used for a same purpose as that of the prediction data generated by the primary, or champion, model. In some cases, multiple secondary models may be included in the production environment, each to be executed on with the production data, and each of which may be configured to generate prediction data for various evaluation purposes. In some embodiments, prior to the third machine learning model being assigned to be the primary model, a different machine learning model (e.g., the fourth machine learning model) may be assigned to be the primary model. Some embodiments include selecting which model is to be the primary model, and also which model or models are to be the secondary models, based on prior performances during prior deployments, accuracy scores computed during training of the models, the use case with which the models are to generate prediction data for, or for other reasons. Additionally, the primary and secondary models may have a same or different execution frequency. In some embodiments, operation 902 may be performed by a subsystem that is the same or similar to model execution subsystem 114.

In an operation 904, the third machine learning model and the fourth machine learning model may be caused to execute on the production data. For example, the third machine learning model (e.g., the primary model) and the fourth machine learning model (e.g., the secondary model) may execute on production data 202. In some embodiments, third output datasets and fourth output datasets may be obtained based on the third machine learning model and the fourth machine learning model, respectively, executing on the production data. In some embodiments, operation 904 may be performed by a subsystem that is the same or similar to model execution subsystem 114.

In an operation 906, a third performance score and a fourth performance score may be computed for the third machine learning model and the fourth machine learning model, respectively. Similar to operation 812, a type of performance metric may be selected in advance of the performance score being computed, where the type of performance metric is selected based on a type of machine learning model that the corresponding output datasets were produced by, a goal of the machine learning model, or other factors. The performance metrics that may be computed may include a mean, variance, bias, or other performance metric. In some embodiments, operation 906 may be performed by a subsystem that is the same or similar to model performance subsystem 116.

In an operation 908, a determination may be made as to whether the third performance score is greater than the fourth performance score. For example, if the third performance score of the third machine learning model is represented as S3 and the fourth performance score of the fourth machine learning model is represented as S4, then a determination is made as to whether S3>S4. In some embodiments, if S3=S4, then this may be considered the same scenario as if S3 is greater than S4. Alternatively, if S3=S4, then this may be considered the same scenario as if S4 is greater than S3. Although only two performance scores, S3 and S4, of two machine learning models are considered in the example of method 900, persons of ordinary skill in the art will recognize that if additional machine learning models are included, then similar comparisons may be performed at operation 908. For example, if a fifth machine learning model is included, which may also be a "secondary" model, then a determination may be made as to whether the third performance score is greater than the fourth performance score and the fifth performance score (e.g., a performance score computed based on the fifth machine learning model executing on the production data). However, for simplicity, operation 908 considers two machine learning models. In some embodiments, operation 908 may be performed by a subsystem that is the same or similar to model performance subsystem 116.

If, at operation 908, it is determined that the third performance score is greater than the fourth performance score, then method 900 may proceed to operation 910. In operation 910, the third machine learning model may be kept as the primary model and the fourth machine learning model may be kept as the secondary model. This may allow for the third machine learning model, which is determined to perform more accurately with respect to the production data, as a source for generating prediction data for the particular use of system 100. In some embodiments, operation 910 may be performed by a subsystem that is the same or similar to model execution subsystem 114, model performance subsystem 116, or a combination of model execution subsystem 114 and model performance subsystem 116.

However, if at operation 910 it is determined that the third performance score is not greater than the fourth performance score, then method 900 may proceed to operation 912. At operation 912, the fourth machine learning model may be assigned as the primary model and the third machine learning model may be assigned as the secondary model. Thus, the fourth machine learning model may be used to generate prediction data for analyzing particular use cases, such as the effectiveness of a particular strategy, service, or other scenario, and the third machine learning model may be used to generate prediction data for evaluation purposes. In some embodiments, operation 910 may be performed by a subsystem that is the same or similar to model execution subsystem 114, model performance subsystem 116, or a combination of model execution subsystem 114 and model performance subsystem 116.

Various aspects of the disclosed embodiments may be implemented via software modules executed directly or, alternatively, using machine learning as a service platform. For example, some embodiments include making an API call where production data is passed to the service and the outputs of one or more processes are returned.

In some embodiments, the various computers and subsystems illustrated in FIG. 1 may include one or more computing devices that are programmed to perform the functions described herein. The computing devices may include one or more electronic storages (e.g., database(s) 130, which may include production data database 132, model database 134, training data database 136, performance database 138, etc., or other electronic storages), one or more physical processors programmed with one or more computer program instructions, and/or other components. It should be noted that although the illustrated embodiments include a single instance of production data database 132, model database 134, training data database 136, performance database 138, multiple instances of each database may be employed. The computing devices may include communication lines or ports to enable the exchange of information with one or more networks (e.g., network(s) 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 described herein is for illustrative purposes, and is not intended to be limiting, as any of subsystems 112-118 may provide more or less functionality than is described. For example, one or more of subsystems 112-118 may be eliminated, and some or all of its functionality may be provided by other ones of subsystems 112-118. As another example, additional subsystems may be programmed to perform some or all of the functionality attributed herein to one of subsystems 112-118.

Although example embodiments have been described in detail for the purpose of illustration, it is to be understood that such detail is solely for that purpose and that embodiments are not limited to the disclosed embodiments, but, on the contrary, are intended to cover modifications and equivalent arrangements that are within the scope of the appended claims. For example, it is to be understood that embodiments contemplate that, to the extent possible, one or more features of any embodiment can be combined with one or more features of any other embodiment.

As used throughout this application, the word "may" is used in a permissive sense (i.e., meaning having the potential to), rather than the mandatory sense (i.e., meaning must). The words "comprise," "comprising," "comprises," "include", "including", and "includes" and the like mean including, but not limited to. As used throughout this application, the singular forms "a," "an," and "the" include plural referents unless the context clearly indicates otherwise, and notwithstanding the use of other terms and phrases for one or more elements, such as "one or more." The term "or" is non-exclusive (i.e., encompassing both "and" and "or"), unless the context clearly indicates otherwise. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property, i.e., each does not necessarily mean each and every.

Additional example embodiments are provided with reference to the following enumerated embodiments:

1. A method, comprising: obtaining first data from a data feed to be provided to a plurality of machine learning models; detecting a changepoint in the first data; responsive to the changepoint being detected, causing a first machine learning model to be executed on the first data to obtain first output datasets; computing a first performance score for the first machine learning model based on the first output datasets; and causing a second machine learning model to execute on the first data based on the first performance score satisfying a first condition.

2. The method of embodiment 1, further comprising: in response to determining that the first performance score satisfies the first condition, building the second machine learning model.

3. The method of embodiment 2, wherein building the second machine learning model comprises: obtaining build data to be used to build the second machine learning model, the build data comprising training data and validation data; selecting a type of machine learning with which the second machine learning model is to be; training a machine learning model using the training data to obtain a trained machine learning model; and determining, based on the validation data, whether the trained machine learning model has an accuracy score greater than or equal to a threshold accuracy score, wherein the trained machine learning model is capable of being used as the second machine learning model in response to determining that the accuracy score is greater than or equal to the threshold accuracy score 4. The method of any one of embodiments 1-3, wherein: the first machine learning model has a first execution frequency; the second machine learning model has a second execution frequency; and the second execution frequency is less than the first execution frequency.

5. The method of embodiment 4, wherein: the first execution frequency comprises an execution frequency of hourly, daily, weekly, or monthly; and the second execution frequency comprises an execution frequency comprises an execution frequency of weekly, monthly, quarterly, or annually such that the second execution is less frequent than the first execution frequency.

6. The method of embodiment 4, wherein the first execution frequency is a weekly execution frequency and the second execution frequency is a monthly execution frequency.

7. The method of any one of embodiments 1-6, wherein obtaining the first data comprises: obtaining the first data via a data feed configured to receive updated application data from one or more real-time applications.

8. The method of embodiment 7, wherein the data feed is selected from a plurality of data feeds based on at least one of a first model identifier of the first machine learning model or a second model identifier of the second machine learning model, wherein the first model identifier indicates a type of machine learning model of the first machine learning mode and the second model identifier indicates a type of machine learning model of the second machine learning model.

9. The method of any of embodiments 7-8, wherein the updated application data comprises a plurality of features, the method comprises: removing one or more features from the plurality of features to generate the production data.

10. The method of any one of embodiments 7-9, wherein the first data comprises production data, and the production data is to be provided to the plurality of machine learning models.

11. The method of any one of embodiments 1-10, wherein detecting the changepoint comprises: determining that a value of a first feature of the first data differs from an expected value for the first feature by more than a threshold amount.

12. The method of embodiment 11, wherein a BDML framework is used to determine whether the first data includes one or more changepoints.

13. The method of any one of embodiments 1-12, further comprising: responsive to the changepoint being detected, causing a third machine learning model to be executed on the first data to obtain second output datasets; and computing a second performance score for the third machine learning model based on the second output datasets, wherein the second machine learning model is caused to execute on the first data based on the first performance score and the second performance score satisfying the first condition.

14. The method of embodiments 13, wherein the first condition being satisfied comprises the first performance score and the second performance score being less than a threshold performance score.

15. The method of any one of embodiments 1-12 and 14, further comprising: determining that the first data is to be provided to the first machine learning model and a third machine learning model; and responsive to the changepoint not being detected, preventing the third machine learning model from being executed on the first data.

16. The method of any one of embodiments 12-15, wherein the first machine learning model and the third machine learning model have a first execution frequency; and the second machine learning model has a second execution frequency, the second execution frequency being less frequent than the first execution frequency.

17. The method of any one of embodiments 1-12, 14, and 16, further comprising: determining that the first data is to be provided to a third machine learning model having an execution frequency less than that of the first machine learning model; and prior to the third machine learning model executing on the first data, preventing the third machine learning model from executing on the first data based on the first performance score satisfying the first condition.

18. The method of any one of embodiments 1-12, 14, 16, and 18, wherein second output data is obtained based on the second machine learning model executing on the first data, the method further comprises: determining that the first data is to be provided to a third machine learning model having an execution frequency less than that of the first machine learning model; and causing the third machine learning model to be executed on the first data to obtain third output data, wherein the second machine learning model is assigned as a primary model and the third machine learning model is assigned as a secondary model.

19. The method of embodiment 18, further comprising: computing a set of performance metrics for the second machine learning model and the third machine learning model; and selecting the third machine learning model to be assigned as the primary model and the second machine learning model to be assigned as the secondary model based on the set of performance metrics computed.

20. One or more tangible, non-transitory, machine-readable media storing instructions that, when executed by one or more processors, effectuation operations comprising those of any of embodiments 1-19.

21. A system comprising: one or more processors; and memory storing computer program instructions that, when executed by the one or more processors, cause the one or more processors to effectuate operations comprising those of any of embodiments 1-19.

What is claimed is:

1. A system for optimizing resource allocation in a multi-thread, multi-dimensional machine learning environment, the system comprising:
   memory storing computer program instructions; and
   one or more processors that, when executing the computer program instructions, effectuate operations comprising:
      obtaining, via a data feed, production data to be provided to a plurality of machine learning models, wherein the plurality of machine learning models comprise a first machine learning model and a second machine learning model each having a first execution frequency;
      detecting a changepoint in the production data based on a value of a first feature of the production data being determined to differ from an expected value for the first feature by more than a threshold amount;
      responsive to the changepoint being detected in the production data, causing both the first machine learning model and the second machine learning model to be executed on the production data to obtain first output datasets and second output datasets from the first machine learning model and the second machine learning model, respectively;
      computing (i) a first performance score for the first machine learning model based on the first output datasets and (ii) a second performance score for the second machine learning model based on the second output datasets; and
      in response to determining that at least one of the first performance score or the second performance score satisfies a first condition, building a third machine learning model having a second execution frequency less than the first execution frequency, wherein the third machine learning model is executed on the production data, and wherein the first condition being satisfied comprises the first performance score or the second performance score being less than a threshold performance score.

2. The system of claim 1, wherein the operations further comprise:
   responsive to the changepoint not being detected in the production data, causing the first machine learning model to be executed on the production data in lieu of the second machine learning model being executed on the production data.

3. The system of claim 1, wherein the plurality of machine learning models further comprises a fourth machine learning model having the second execution frequency, the operations further comprise:
   causing the third machine learning model and the fourth machine learning model to be executed on the production data to obtain third output datasets and fourth output datasets, wherein the third machine learning model is assigned as a primary model, and the fourth machine learning model is assigned as a secondary model;
   computing (i) a third performance score for the third machine learning model based on the third output datasets and (ii) a fourth performance score for the fourth machine learning model based on the fourth output datasets; and
   causing, based on the third performance score and the fourth performance score, the third machine learning model, the fourth machine learning model, or a different machine learning model to remain or to be assigned as a primary model.

4. The system of claim 1, wherein the plurality of machine learning models further comprises a fourth machine learning model having the second execution frequency, the operations further comprise:
   preventing the fourth machine learning model from being executed on the production data in response to determining that at least one of the first performance score or the second performance score satisfies the first condition.

5. A non-transitory computer-readable medium storing computer program instructions that, when executed by one or more processors, effectuate operations comprising:
   obtaining first data from a data feed to be provided to a plurality of machine learning models;
   detecting a changepoint in the first data;
   responsive to the changepoint being detected, causing a first machine learning model to be executed on the first data to obtain first output datasets;
   computing a first performance score for the first machine learning model based on the first output datasets; and
   causing a second machine learning model to execute on the first data based on the first performance score satisfying a first condition.

6. The non-transitory computer-readable medium of claim 5, wherein the operations further comprise:
   in response to determining that the first performance score satisfies the first condition, building the second machine learning model.

7. The non-transitory computer-readable medium of claim 5, wherein:
   the first machine learning model has a first execution frequency;
   the second machine learning model has a second execution frequency; and
   the second execution frequency is less than the first execution frequency.

8. The non-transitory computer-readable medium of claim 5, wherein obtaining the first data comprises:
  obtaining the first data via a data feed configured to receive updated application data from one or more real-time applications.

9. The non-transitory computer-readable medium of claim 5, wherein detecting the changepoint comprises:
  determining that a value of a first feature of the first data differs from an expected value for the first feature by more than a threshold amount.

10. The non-transitory computer-readable medium of claim 5, wherein the operations further comprise:
  responsive to the changepoint being detected, causing a third machine learning model to be executed on the first data to obtain second output datasets; and
  computing a second performance score for the second machine learning model based on the second output datasets, wherein the second machine learning model is caused to execute on the first data based on the first performance score and the second performance score satisfying the first condition, wherein the first condition being satisfied comprises the first performance score and the second performance score being less than a threshold performance score.

11. The non-transitory computer-readable medium of claim 5, wherein the operations further comprise:
  determining that the first data is to be provided to the first machine learning model and a third machine learning model; and
  responsive to the changepoint not being detected, preventing the third machine learning model from being executed on the first data.

12. The non-transitory computer-readable medium of claim 5, wherein the operations further comprise:
  determining that the first data is to be provided to a third machine learning model having an execution frequency less than that of the first machine learning model; and
  prior to the third machine learning model executing on the first data, preventing the third machine learning model from executing on the first data based on the first performance score satisfying the first condition.

13. The non-transitory computer-readable medium of claim 5, wherein second output data is obtained based on the second machine learning model executing on the first data, the operations further comprise:
  determining that the first data is to be provided to a third machine learning model having an execution frequency less than that of the first machine learning model; and
  causing the third machine learning model to be executed on the first data to obtain third output data, wherein the second machine learning model is assigned as a primary model and the third machine learning model is assigned as a secondary model.

14. The non-transitory computer-readable medium of claim 13, wherein the operations further comprise:
  computing a set of performance metrics for the second machine learning model and the third machine learning model; and
  selecting the third machine learning model to be assigned as the primary model and the second machine learning model to be assigned as the secondary model based on the set of performance metrics computed.

15. A method implemented by one or more processors configured to execute computer program instructions, the method comprising:
  obtaining first data from a data feed to be provided to a plurality of machine learning models;
  detecting a changepoint in the first data;
  responsive to the changepoint being detected, causing a first machine learning model to be executed on the first data to obtain first output datasets;
  computing a first performance score for the first machine learning model based on the first output datasets; and
  causing a second machine learning model to execute on the first data based on the first performance score satisfying a first condition.

16. The method of claim 15, further comprising:
  in response to determining that the first performance score satisfies the first condition, building the second machine learning model, wherein the first condition being satisfied comprises the first performance score being less than a threshold performance score.

17. The method of claim 15, wherein detecting the changepoint comprises:
  determining that a value of a first feature of the first data differs from an expected value for the first feature by more than a threshold amount.

18. The method of claim 15, further comprising:
  determining that the first data is to be provided to the first machine learning model and a third machine learning model; and
  responsive to the changepoint not being detected, preventing the third machine learning model from being executed on the first data.

19. The method of claim 15, further comprising:
  determining that the first data is to be provided to a third machine learning model having an execution frequency less than that of the first machine learning model; and
  prior to the third machine learning model executing on the first data, preventing the third machine learning model from executing on the first data based on the first performance score satisfying the first condition.

20. The method of claim 15, wherein second output data is obtained based on the second machine learning model executing on the first data, the method further comprises:
  determining that the first data is to be provided to a third machine learning model having an execution frequency less than that of the first machine learning model;
  causing the third machine learning model to be executed on the first data to obtain third output data, wherein the second machine learning model is assigned as a primary model and the third machine learning model is assigned as a secondary model;
  computing a set of performance metrics for the second machine learning model and the third machine learning model; and
  selecting the third machine learning model to be assigned as the primary model and the third machine learning model to be assigned as the secondary model based on the set of performance metrics computed.

* * * * *